US012790211B2

(12) United States Patent
McCahill et al.

(10) Patent No.: US 12,790,211 B2
(45) Date of Patent: Nov. 10, 2026

(54) AIR-TO-SYNGAS SYSTEMS AND PROCESSES

(71) Applicant: Carbon Engineering ULC, Squamish (CA)

(72) Inventors: Jenny Sara Jean McCahill, Squamish (CA); Douglas Edward Olmstead, Squamish (CA); Kenton Robert Heidel, Squamish (CA); Navjot Kaur Sandhu, Squamish (CA)

(73) Assignee: Carbon Engineering ULC, Squamish (CA)

(*) Notice: Subject to any disclaimer, the term of this patent is extended or adjusted under 35 U.S.C. 154(b) by 819 days.

(21) Appl. No.: 18/298,173

(22) Filed: Apr. 10, 2023

(65) Prior Publication Data

US 2023/0322554 A1 Oct. 12, 2023

Related U.S. Application Data

(62) Division of application No. 16/772,693, filed as application No. PCT/US2018/065270 on Dec. 12, 2018, now Pat. No. 11,623,863.

(Continued)

(51) Int. Cl.

| | |
|---|---|
| ***C01B 3/42*** | (2026.01) |
| ***B01J 8/22*** | (2006.01) |
| ***C01F 11/06*** | (2006.01) |

(52) U.S. Cl.

CPC ................. *C01B 3/42* (2013.01); *B01J 8/228* (2013.01); *C01F 11/06* (2013.01);

(Continued)

(58) Field of Classification Search

CPC ..................... B01J 8/0055; B01J 8/228; B01J 2208/00504; B01J 2219/00033;

(Continued)

(56) References Cited

U.S. PATENT DOCUMENTS

| | | | | |
|---|---|---|---|---|
| 4,568,583 | A | 2/1986 | Twigg et al. | |
| 10,106,753 | B1 * | 10/2018 | Graham .................. | C10G 2/32 |

(Continued)

FOREIGN PATENT DOCUMENTS

| | | |
|---|---|---|
| EP | 1584603 | 10/2005 |

OTHER PUBLICATIONS

Halmann et al., "Production of lime, hydrogen, and methanol by the thermo-neutral combined calcination of limestone with partial oxidation of natural gas or coal", Energy, 2006, 31:1533-1541.

(Continued)

*Primary Examiner* — Dapinder Singh

(74) *Attorney, Agent, or Firm* — Fish & Richardson P.C.

(57) ABSTRACT

Techniques for converting carbonate material to carbon monoxide include transferring heat and at least one feed stream that includes a carbonate material and at least one of hydrogen, oxygen, water, or a hydrocarbon, into an integrated calcination and syngas production system that includes a syngas generating calciner (SGC) reactor; calcining the carbonate material to produce a carbon dioxide product and a solid oxide product; initiating a syngas production reaction; producing, from the syngas production reaction, at least one syngas product that includes at least one of a carbon monoxide product, a water product or a hydrogen product; and transferring at least one of the solid oxide product or the at least one syngas product out of the SGC reactor.

22 Claims, 9 Drawing Sheets

Related U.S. Application Data

(60) Provisional application No. 62/597,733, filed on Dec. 12, 2017.

(52) U.S. Cl.
CPC ................. *B01J 2208/00504* (2013.01); *B01J 2219/00033* (2013.01); *B01J 2219/00049* (2013.01); *B01J 2219/029* (2013.01); *C01B 2203/0238* (2013.01); *C01B 2203/0283* (2013.01); *C01B 2203/0838* (2013.01)

(58) Field of Classification Search
CPC .... B01J 2219/00049; B01J 2219/00087; B01J 2219/029; C01B 3/42; C01B 2203/0233; C01B 2203/0238; C01B 2203/0244; C01B 2203/0261; C01B 2203/0283; C01B 2203/0405; C01B 2203/0495; C01B 2203/0838; C01F 11/06; Y02P 20/133; Y02P 20/141; Y02P 30/00
See application file for complete search history.

(56) References Cited

U.S. PATENT DOCUMENTS

| | | | | |
|---|---|---|---|---|
| 10,155,661 | B2 * | 12/2018 | Kang | C01B 3/48 |
| 11,623,863 | B2 | 4/2023 | McCahill et al. | |
| 2003/0103893 | A1 * | 6/2003 | de Lasa | B01J 37/0205 423/653 |
| 2003/0129123 | A1 * | 7/2003 | Ramani | B01J 8/0221 48/198.2 |
| 2009/0114352 | A1 * | 5/2009 | Rossi | C04B 2/08 162/29 |
| 2012/0079767 | A1 | 4/2012 | Aplin et al. | |
| 2012/0145965 | A1 * | 6/2012 | Simmons | C07C 29/152 422/162 |
| 2013/0012605 | A1 * | 1/2013 | Zhou | C05F 17/50 422/187 |
| 2015/0375211 | A1 | 12/2015 | Ross et al. | |
| 2020/0299132 | A1 | 9/2020 | McCahill et al. | |

OTHER PUBLICATIONS

Halmann et al., "Thermoneutral Coproduction of Calcium Oxide and Syngas by Combined Decomposition of Calcium Carbonate and Partial Oxidation/CO2-Reforming of Methane", Energy and Fuels, 2003, 17:774-778.
International Preliminary Report on Patentability in International Application No. PCT/US2018/065270, dated Jun. 25, 2020, 11 pages.
International Search Report and Written Opinion in International Application No. PCT/US2018/065270, dated Apr. 26, 2019, 12 pages.
Padeste et al., "The influence of transition metals on the thermal decomposition of calcium carbonate in hydrogen", Mat. Res. Bull., 1990, 29:1299-1305.
Reller et al., "Formation of organic carbon compounds from metal carbonates", Nature, 1987, 329:527-529.
Reller et al., "Thermochemical reactivity of metal carbonates," Chimia, 1991, 45:262-266.
Romano et al. "Application of the Sorption Enhanced-Steam Reforming process in combined cycle-based power plants" Energy Procedia 4 (2011) 1125-1132 (Year: 2011).
Sommerbauer et al., "Reductive calcination of mineral magnesite: hydrogenation of carbon dioxide without catalysts", Chemical Engineering Technology, 2016, 39(11):2035-2041.
Sommerbauer et al., "Synthesis of Carbon Monoxide from Hydrogen and Magnesite/Dolomite", Chemical Engineering Technology, 2017, 89(1-2):172-179.
Yoshida et al., "Methane formation by metal-catalyzed hydrogenation of solid calcium carbonate", Catalysis Letters, 1999, 58:119-122.

* cited by examiner

AIR-TO-SYNGAS SYSTEMS AND PROCESSES

CROSS-REFERENCE TO RELATED APPLICATIONS

This application is a divisional of U.S. patent application Ser. No. 16/772,693, filed on Jun. 12, 2020, which is a is a National Phase Application under 35 U.S.C. § 371 and claims the benefit of International Application No. PCT/US2018/065270, filed Dec. 12, 2018, which in turn claims priority under 35 U.S.C. § 119 to U.S. Provisional Application Ser. No. 62/597,733, filed on Dec. 12, 2017, each of which are incorporated by reference in their entirety herein.

TECHNICAL FIELD

This disclosure describes systems, apparatus, and methods for converting carbonate material to carbon monoxide.

BACKGROUND

Calcination reactions as performed in the pulp and paper, cement, and refractory industries generate carbon dioxide gas, which can be used as a feedstock for other processes, such as syngas production.

SUMMARY

In an example implementation, a method includes transferring heat and at least one feed stream including carbonate material and at least one of hydrogen, oxygen, water, or a hydrocarbon, into an integrated calcination and syngas production system that includes a syngas generating calciner (SGC) reactor, calcining the carbonate material to produce a carbon dioxide product and a solid oxide product, initiating a syngas production reaction, producing, from the syngas production reaction, at least one syngas product that includes at least one of a carbon monoxide product, a water product or a hydrogen product, and transferring at least one of the solid oxide or at least one syngas product out of the SGC reactor.

In an aspect combinable with the example implementation, the integrated calcination and syngas production system includes a catalytically active material.

In another aspect combinable with any of the previous aspects, at least a portion of the catalytically active material is transferred into the integrated calcination and syngas production system as a feed stream, and at least a portion of the catalytically active material is transferred from the integrated calcination and syngas production system with at least one of the solid oxide or the at least one syngas product.

In another aspect combinable with any of the previous aspects, the SGC reactor includes one or more internal surfaces, and at least a portion of the one or more internal surfaces includes at least a portion of the catalytically active or is coated with at least a portion of the catalytically active material.

In another aspect combinable with any of the previous aspects, the at least a portion of the catalytically active material includes an open metal foam.

In another aspect combinable with any of the previous aspects, one or more of the carbonate material and solid oxide product act as a catalytically active material for the syngas production reaction.

In another aspect combinable with any of the previous aspects, the syngas production reactions include at least one of a reverse water gas shift (RWGS) reaction or a dry methane reforming (DMR) reaction.

In another aspect combinable with any of the previous aspects, the SGC reactor includes one or more of a shaft kiln, a rotary kiln or a fluidized bed calciner.

In another aspect combinable with any of the previous aspects, the heat includes a heat stream produced from an electric source, a fuel combustion source, or a combination thereof.

In another aspect combinable with any of the previous aspects, the electric source is produced from renewable energy.

In another aspect combinable with any of the previous aspects, the at least one feed stream includes potassium.

In another aspect combinable with any of the previous aspects, the SGC reactor includes a heating zone, and the heating zone includes a ceramic material.

In another aspect combinable with any of the previous aspects, the heating zone includes a material barrier disposed between one or more walls of the SGC reactor and the ceramic material to prevent the at least one syngas product from entering a space between the one or more walls of the SGC reactor and the ceramic material.

In another aspect combinable with any of the previous aspects, a gas stream is disposed between one or more walls of the SGC reactor and the ceramic lining.

In another aspect combinable with any of the previous aspects, the gas stream provides a positive pressure between the one or more walls of the SGC reactor and the ceramic material, and the positive pressure prevents the at least one syngas product from entering a space between the one or more walls of the SGC reactor and the ceramic material.

In another aspect combinable with any of the previous aspects, the SGC reactor is configured to receive at least one of a first recycle stream or a second recycle stream.

In another aspect combinable with any of the previous aspects, the first recycle stream and the second recycle stream include a first valve and a second valve, respectively.

In another aspect combinable with any of the previous aspects, the SGC reactor is fluidly coupled to a downstream unit, and the SGC reactor is configured to provide at least a portion of the syngas product to the downstream; and the downstream unit is configured to provide the second recycle stream to the SGC reactor.

In another aspect combinable with any of the previous aspects, the integrated calcination and syngas production system further includes at least one of first process unit or a second process unit, wherein the first process unit processes the first recycle stream and the second process unit processes the second recycle stream.

In another aspect combinable with any of the previous aspects, the first process unit generates at least a first discharge stream and the second process unit generates at least a second discharge stream, and the SGC reactor is configured to receive at least one of a portion of the first discharge stream or a portion of the second discharge stream.

In another aspect combinable with any of the previous aspects, the SGC reactor includes an insulated enclosure, and one or more reactor tubes.

In another aspect combinable with any of the previous aspects, the insulated enclosure includes a furnace.

In another aspect combinable with any of the previous aspects, the one or more reactor tubes are filled with metal catalyst material.

In another aspect combinable with any of the previous aspects, transferring heat and at least one feed stream comprising a carbonate material and at least one of hydrogen, oxygen, water, or a hydrocarbon, into an integrated calcination and syngas production system further includes transferring the at least one feed stream and a second feed stream to feed introduction unit fluidly coupled to the SGC reactor, and providing a combined feed stream from the feed introduction unit to the SGC reactor, the combined feed stream including the at least one feed stream and the second feed stream.

In another aspect combinable with any of the previous aspects, the feed introduction unit includes one or more of a blower, lock hopper, screw feeder, rotary valve, eductor, or a combination thereof.

In another example implementation, an industrial process includes performing an industrial process, the industrial process including at least one of direct air capture, carbon dioxide capture, a cement process, a refractory process, or a pulp and paper process, and during performance of the industrial process, performing a subprocess that includes transferring heat and at least one feed stream including a carbonate material and at least one of hydrogen, oxygen, water, or a hydrocarbon, into an integrated calcination and syngas production system that includes a syngas generating calciner (SGC) reactor, calcining the carbonate material to produce a carbon dioxide product and a solid oxide product, initiating a syngas production reaction, producing, from the syngas production reaction, at least one syngas product that includes at least one of a carbon monoxide product, a water product or a hydrogen product, and transferring at least one of the solid oxide product or the at least one syngas product out of the SGC reactor.

In another example implementation, an apparatus includes a syngas generating calciner (SGC) reactor. The SGC reactor includes one or more inlet ports arranged to receive at least one feed stream that includes a carbonate material and at least one of hydrogen, oxygen, water, or a hydrocarbon, into a volume of a SGC reactor. A heat transfer assembly is fluidly coupled to the SGC reactor to provide heat. A reaction zone is fluidly coupled to the heat transfer assembly and the SGC reactor, and at least a portion of the heat is transferred to the carbonate material and reactions occur to produce at least one product that includes at least one of a carbon dioxide product, a syngas product or a solid oxide product, and at least one outlet port is positioned to discharge at least one of the carbon dioxide product, syngas product, carbonate material, or the solid oxide product, out of the SGC reactor system.

In an aspect combinable with the general implementation, the at least one outlet port is configured to separate at least a portion of the syngas product from at least one of the carbonate material, or solid oxide product, and discharge the at least a portion of the syngas product out of the SGC reactor.

In another aspect combinable with any of the previous aspects, the SGC reactor includes a catalytically active material.

In another aspect combinable with any of the previous aspects, at least a portion of the catalytically active material is transferred into the SGC reactor through one or more of the inlet ports, and is discharged from the SGC reactor through one or more of the outlet ports.

In another aspect combinable with any of the previous aspects, the SGC reactor includes one or more internal surfaces, and at least a portion of the one or more internal surfaces includes at least a portion of the catalytically active material or is coated with at least a portion of the catalytically active material.

In another aspect combinable with any of the previous aspects, wherein the at least a portion of the catalytically active material includes an open metal foam.

In another aspect combinable with any of the previous aspects, at least one transfer device is configured to recycle at least a portion of the discharged catalytically active material from the outlet port back to the inlet port.

In another aspect combinable with any of the previous aspects, the SGC reactor is fluidly coupled to at least one of a solid separation unit, a catalyst regeneration unit, a heating device, or a downstream process unit. A transfer device transfers at least a portion of the discharged catalytically active material to at least one of the solid separation unit, the catalyst regeneration unit, the heating device, or the downstream process unit, and a second transfer device transfers at least a portion of the catalytically active material from at least one of the solid separation unit, the catalyst regeneration unit, the heating device, or the downstream process unit to the inlet port of the SGC reactor.

In another aspect combinable with any of the previous aspects, the SGC reactor further includes a heating zone, wherein the heating zone includes a ceramic material.

In another aspect combinable with any of the previous aspects, the heating zone further includes a material barrier disposed between one or more walls of the SGC reactor and the ceramic material to prevent the at least one product from entering a space between the one or more walls of the SGC reactor and the ceramic material.

In another aspect combinable with any of the previous aspects, a fluid disposed between one or more walls of the SGC reactor and the ceramic material.

In another aspect combinable with any of the previous aspects, the fluid provides a positive pressure across a space between the one or more walls of the SGC reactor and the ceramic material, wherein the positive pressure prevents the at least one product from entering a space between the one or more walls of the SGC reactor and the ceramic material.

In another aspect combinable with any of the previous aspects, the SGC reactor is configured to receive at least one of a first recycle stream or a second recycle stream In another aspect combinable with any of the previous aspects, the first recycle stream and the second recycle stream include a first valve and a second valve, respectively.

In another aspect combinable with any of the previous aspects, the SGC reactor is fluidly coupled to a downstream unit, and the SGC reactor is configured to provide at least a portion of the syngas product to the downstream; and the downstream unit is configured to provide the second recycle stream to the SGC reactor.

In another aspect combinable with any of the previous aspects, at least one of a first process unit or a second process unit, wherein the first recycle stream is processed by the first process unit and the second recycle stream is processed by the second process unit.

In another aspect combinable with any of the previous aspects, at least one of a first discharge stream or a second discharge stream, and wherein the SGC reactor is configured to receive at least one of a portion of the first discharge stream or a portion of the second discharge stream.

In another aspect combinable with any of the previous aspects, the SGC reactor includes at least one of a shaft kiln, a rotary kiln, or a fluidized bed calciner.

In another aspect combinable with any of the previous aspects, the SGC reactor includes an insulated enclosure, and one or more reactor tubes.

In another aspect combinable with any of the previous aspects, the insulated enclosure includes a furnace.

In another aspect combinable with any of the previous aspects, the one or more reactor tubes are filled with metal catalyst material.

In another aspect combinable with any of the previous aspects, the SGC reactor is fluidly coupled to a feed introduction unit, and the feed introduction unit is configured to receive the at least one feed stream and a second feed stream, and to provide a combined feed stream to the SGC reactor.

In another aspect combinable with any of the previous aspects, the feed introduction unit includes one or more of a blower, lock hopper, screw feeder, rotary valve, eductor, or a combination thereof.

In another aspect combinable with any of the previous aspects, the heat transfer assembly is configured to produce heat from at least one of an electrical source, a fuel combustion source, or a combination thereof.

In another aspect combinable with any of the previous aspects, the SGC reactor is coupled to at least one of a direct air capture plant, a carbon dioxide capture plant, a cement plant, a refractory plant, or a pulp and paper plant.

In another aspect combinable with any of the previous aspects, the at least one feed stream includes potassium.

The details of one or more implementations of the subject matter described in this disclosure are set forth in the accompanying drawings and the description below. Other features, aspects, and advantages of the subject matter will become apparent from the description, the drawings, and the claims.

The details of one or more implementations of the subject matter described in this disclosure are set forth in the accompanying drawings and the description below. Other features, aspects, and advantages of the subject matter will become apparent from the description, the drawings, and the claims.

DETAILED DESCRIPTION

Figure 1:
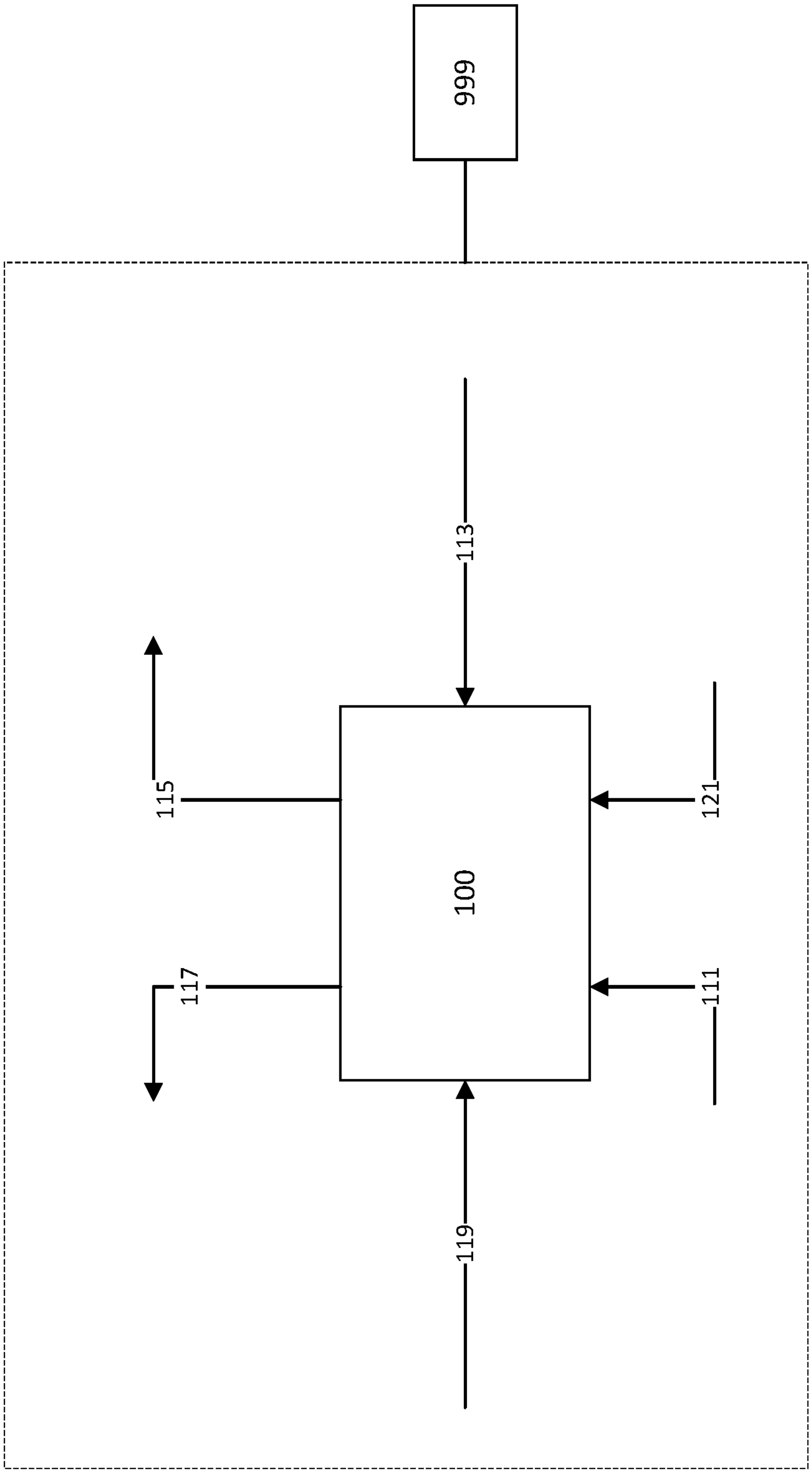
FIG. 1 is a schematic block diagram of an integrated calcination and syngas production system for converting carbonate material to carbon monoxide.

The present disclosure describes example implementations of an integrated calcination and syngas production system that may enable the co-production of solid oxide materials and syngas within the same reactor system. This may in turn enable a reduction in the overall number of reactors and auxiliary equipment, such as compressors and heat exchangers, required to produce the final syngas product.

Conventional methods of calcining carbonates and using $CO_2$ to produce carbon monoxide (one of the main components of syngas) are typically carried out in separate industries, let alone separate reactor systems. Based on this, the expertise and knowledge gained in one industry has no clear path of transfer or use in the other process as currently operated. Furthermore, conventional syngas generating calciner (SGC) reactors are primarily designed for gaseous feedstock and development is focused on advanced, often expensive, and in some cases highly doped catalyst fixed beds for the synthesis of syngas. On the other hand, calciners are designed to handle solids, and are not designed for a hydrogen atmosphere.

The primary purpose of calcination in industries like cement, pulp and paper, and refractories is the production of solid oxide. In these industries, the $CO_2$ is considered a waste stream, that has conventionally been emitted into the atmosphere. Any attempts at processing the $CO_2$ by-product is done primarily as an attempt to reduce emissions. On the other hand, syngas processing facilities are designed to optimize the production of gaseous products, such as syngas. Furthermore, the presence of solids, such as carbonates, in a conventional syngas reactor would likely result in plugging and/or damage, including damage to the aforementioned advanced catalyst fixed beds, which are not designed for environments with high loading content of mobile solid material.

From any of the above mentioned existing industry perspectives, an obvious incentive and skillset to make the significant modifications necessary to integrate these two processes, and optimize the integrated operating parameters, is not clear. However, integrating the two reactions in one reactor system has economic advantages for the cement, refractory manufacturing, and pulp and paper industries, in that it simultaneously calcines the carbonate and converts the $CO_2$ waste stream into a more valuable product, carbon monoxide. Carbon monoxide can be combined with hydrogen and, in some aspects, other gases such as $CO_2$ and $H_2O$, to provide synthetic gas, also known as syngas. Syngas can be further processed to produce valuable chemicals, plastics and a range of synthetic fuels including diesel and gasoline. The implementations described herein can be used in place of the calciner reactor units used in the above mentioned industrial plants, for example the kiln, rotary and fluidized bed units, with little if any modifications required to other upstream and downstream plant units.

Integrating the two reactions in one reactor system has similar economic advantages for carbon dioxide capture facilities. In $CO_2$ capture applications currently available, the $CO_2$ is the main product, and an economic, low carbon intensity process and products are required from an emissions perspective. Incorporating the integrated syngas calcination reactor system with this application, in addition to selecting efficient renewable energy sources, equipment types, heat integration and operation modes for the overall system, may enable a commercially viable $CO_2$ capture technology for production of low carbon intensity synthetic fuels.

Integrating the two reactions into one reactor system may also enable the syngas production reactions to enhance the calcination reaction, due to the calcination $CO_2$ product being consumed in the syngas production reactions, thus causing the calcination equilibrium to shift, improving the calcination rate and conversion. This may enable the system to run at a lower temperature to produce the same conversion results, which in turn would require less input energy.

The implementations described herein may be independent of solid feedstock composition and/or form and as such, enable the use of a wider range of calcination equipment including for example furnaces, rotary and shaft kilns, fluidized bed calciners and the like.

These implementations may also provide greater flexibility and extensive means of interfacing a variety of catalytic material with the gaseous feedstocks throughout the reactor system. Furthermore, these implementations may enable one or more of the solid materials present as part of the calcination reactions to catalyze or enhance the production of syngas.

Finally, the implementations described herein may operate partially or wholly on electrical energy, where that electricity can be supplied by renewable energy sources such as wind, solar, hydro, nuclear and the like, which in turn will reduce the use of fossil fuel combustion for energy requirements and reduce the carbon intensity of the process and the syngas and downstream products.

Calcination Applications

Existing industries such as cement, refractory, and pulp and paper utilize calcination of carbonates to form oxide materials, with the resulting $CO_2$ gas being exhausted as a by-product of the process. In addition to these applications, the calcination process can be used as part of a $CO_2$ capture process to capture $CO_2$ from industrial combustion and/or exhaust gases or from more dilute sources such as atmospheric air. One way to capitalize on the gaseous $CO_2$ produced from any of these applications is to turn it into feedstock for syngas production, where it can be used to produce low carbon intensity syngas, which can in turn produce end products, such as synthetic fuel.

In any of these applications, the calcination reaction, where the solid carbonate material is heated and decomposed, can be illustrated as follows:

$$CaCO_3(s) \rightarrow CaO(s) + CO_2(g) \quad \Delta H = +178 \text{ kJ/mol}$$

While calcium carbonate and magnesium carbonate compounds are common, carbonates may also contain one or more of sodium, potassium, uranium, aluminum, titanium, nickel, iron, copper, zinc, lead, manganese, strontium, cobalt, cadmium, bismuth, and barium.

In addition to composition, the carbonate feed material used in the various industries and applications may consist of a range of sizes, from small particles as seen in applications that generate lime mud (e.g., between about 1 micron to about 100 microns diameter), to mid range as seen in applications where carbonate pellets are grown through crystallization (e.g., between about 50 microns to about 2 millimetres), up to larger ranges as seen in applications where the carbonate is either formed into pellets, bricks or other shapes, or is mined from geological sources (e.g., up to several centimetres in diameter).

The calcination process as seen in industries such as pulp and paper, refractory, cement, and carbon capture, takes place at high temperatures, in the range of approximately 400° C. to 1600° C., and in a variety of calcining equipment including shaft and rotary kilns and fluidized bed calciners.

In the pulp and paper industry, the Kraft chemical recovery process includes calcination of fine micron sized lime mud particles at temperatures of between approximately 800° C. up to approximately 1360° C. In the cement industry the calcination and clinker process includes a larger size range of agglomerates, pellets or rocks of carbonate material.

In the cement process, the $CaCO_3$ calcination/decomposition step is carried out at a temperature range of approximately 450° C.-900° C., which is followed by clinker formation at higher temperatures of up to approximately 1550° C. The calcination process includes the decomposition of the solid material, so that at least one of its constituents, including for example water and/or $CO_2$, is volatized as a gas. The components of the cement feed, such as the calcined calcium oxide, alumina, ferric oxide, silica and any other metal oxides present, interact with each other at these high temperatures and exothermically react to form the main components of the cement clinker.

In the refractory manufacturing industry, the raw material is crushed, grinded, potentially classified, and then calcined. The material may be further processed, including steps such as forming and firing before producing a final product. In the calcining and firing steps, the carbonate material is processed at high temperatures between 400° C. and 1600° C.

Syngas Production Applications

In common syngas production processes, such as steam methane reforming, dry methane reforming and gas to liquids (GTL) applications, the syngas reactor typically contains a fixed packed or fluidized bed of catalyst and is fed feedstocks including one or more of carbon dioxide, hydrogen, oxygen, methane, other hydrocarbons and water, to perform one or more of the following syngas production reactions:

Reverse Water Gas Shift (RWGS):

$$CO_2(g) + H_2(g) \leftarrow\rightarrow CO(g) + H_2O(g) \quad \Delta H = +41 \text{ kJ/mol}$$

Dry Methane Reforming (DMR):

$$CH_4(g) + CO_2(g) \leftarrow\rightarrow 2CO(g) + 2H_2(g) \quad \Delta H = +247 \text{ kJ/mol}$$

Steam Methane Reforming (SMR):

$$CH_4(g) + H_2O(g) \leftarrow\rightarrow CO(g) + 3H_2(g) \quad \Delta H = +206 \text{ kJ/mol}$$

Partial Oxidation Reforming (POR):

$$CH_4(g) + \tfrac{1}{2}O_2(g) \rightarrow CO(g) + 2H_2(g) \quad \Delta H = -35.6 \text{ kJ/mol}$$

Syngas production is used in industries including oil and gas, hydrogen, methanol, fuel cell and ammonia production, and may take place at higher temperatures, for example within the range of 500° C. to 1100° C., and in reactors that house catalytic material in either a packed/fixed or bubbling fluidized bed. Operating pressures of syngas production units can vary between close to atmospheric up to approximately 100 bar, in order to enable the syngas product to feed into high pressure downstream units including liquid fuel production systems such as Fischer Tropsch and the like.

Integrated Calciner and Syngas Production

Each of the integrated calciner and syngas system configurations described later may include various types of common calciner vessels as a basis for the reaction vessels, including for example shaft kilns, rotary kilns, fluidized beds. These vessels may in addition be modified, lined or coated with a material that is catalytically active within one or more of the reactions taking place within the vessel.

In some implementations that include shaft or rotary kiln reactor vessels or fluidized bed vessels, at least a portion of the catalytically active material may be introduced as a stream to the vessel, and fed either separately or with one of the other solid feed streams into the vessel in a semi-continuous or continuous manner. In this implementation, the catalytically active material may also leave the reactor with the solid product material stream. In some aspects, at least a portion of the catalytically active material may be physically different than the solid product material, and may be separated based on the physical difference, such as to remove and recycle the catalytically active material back to the feed streams to the reactor. In some aspects, the catalytically active material may stay with the solid product material and be sent to downstream processes, wherein it can be separated and collected downstream for recycling, or it can cycle through the process along with the solid material back to the feed stream of the reactor system.

In some implementations that include shaft or rotary kiln reactor vessels or fluidized bed vessels, the catalytically active material may be applied as a coat on at least a portion of the internal surfaces of the reaction vessel, as an integral part of the vessel structure (e.g., walls, fins, any exposed electric elements), as part of the packed or structured catalyst bed, or a combination of any of the above, and remain within the vessel rather than move through the vessel with the solid material streams. In some implementations, the composition of the internal surfaces of the reaction vessel may include the catalytically actively material. In some implementations, at least a portion of the reaction vessel includes an open metal foam, such as Ni foam. In some aspects, the open metal foam includes an open, porous structure that could provide enhanced surface area. In some aspects, the enhanced surface area could provide an interface for the catalyst and reactants within the SGC reactor. In some aspects, the open metal foam could include materials such as NOVAMET open cell nickel foam. In some aspects, the open metal foam could be attached to at least a portion of the reactor internals, for example it could be attached to the inside cladding. In some implementations, reactants entering the reactor vessel are forced to pass through a metal foam attached to the internal surfaces of the reaction vessel.

In some implementations that include fluidized bed vessels, for example bubbling fluidized bed vessels, at least a portion of the catalytically active material may be used as part of the bubbling fluidized bed, and remain within the vessel rather than move through the vessel with the solid material streams.

In some implementations that include shaft kiln vessels, the heat and cooling units may include packed bed ceramic lined vessels for solid-gas heat exchange.

In some implementations that include rotary kiln vessels, the heat and cooling units may include known heat exchange equipment that is typically used in rotary kiln systems, for example any types commonly used in the pulp & paper and cement industries. These may include coolers such as rotary, integral, planetary, bucket or moving grate, packed bed and cross bar coolers. In some aspects the heaters may include rotary heaters, fluid bed heaters, cyclonic and packed bed.

In some implementations that include fluidized bed calciner vessels, the heat and cooling units may include fluidized bed coolers, packed bed heat units, ceramic bubbling fluidized beds, cyclones and the like.

Each of the configurations described later may include process streams (also called "streams") within an integrated calcination and syngas production system for converting carbonate to carbon monoxide, and the system may include a fluidized bed. The process streams can be flowed using one or more flow control systems implemented throughout the system. A flow control system can include one or more flow pumps to pump the process streams, one or more flow pipes through which the process streams are flowed and one or more valves to regulate the flow of streams through the pipes.

In some implementations, a flow control system can be operated manually. For example, an operator can set a flow rate for each pump or transfer device and set valve open or close positions to regulate the flow of the process streams through the pipes in the flow control system. Once the operator has set the flow rates and the valve open or close positions for all flow control systems distributed across the system for converting carbonate to carbon monoxide and solid oxide, the flow control system can flow the streams under constant flow conditions, for example, constant volumetric rate or other flow conditions. To change the flow conditions, the operator can manually operate the flow control system, for example, by changing the pump flow rate or the valve open or close position.

In some implementations, a flow control system can be operated automatically. For example, the flow control system can be connected to a computer or control system (e.g., control system 999) to operate the flow control system. The control system can include a computer-readable medium storing instructions (such as flow control instructions and other instructions) executable by one or more processors to perform operations (such as flow control operations). An operator can set the flow rates and the valve open or close positions for all flow control systems distributed across the facility using the control system. In such implementations, the operator can manually change the flow conditions by providing inputs through the control system. Also, in such implementations, the control system can automatically (that is, without manual intervention) control one or more of the flow control systems, for example, using feedback systems connected to the control system. For example, a sensor (such as a pressure sensor, temperature sensor or other sensor) can be connected to a pipe through which a process stream flows. The sensor can monitor and provide a flow condition (such as a pressure, temperature, or other flow condition) of the process stream to the control system. In response to the flow condition exceeding a threshold (such as a threshold pressure value, a threshold temperature value, or other threshold value), the control system can automatically perform operations. For example, if the pressure or temperature in the pipe exceeds the threshold pressure value or the threshold temperature value, respectively, the control system can provide a signal to the pump to decrease a flow rate, a signal to open a valve to relieve the pressure, a signal to shut down process stream flow, or other signals.

Referring to FIG. 1, carbonate conversion to carbon monoxide is described with respect to the illustrative calcination and syngas production system 100, where the carbonate source for calcination may be derived from industrial sources such as cement processing, refractory manufacturing, pulp and paper processing or $CO_2$ capture processing. The integrated calcination and syngas production system 100 includes a syngas generating calciner (SGC) reactor and may also include additional componentry, such as boiler systems, material transfer equipment, catalyst regeneration and cleanup units, heat and cooling exchangers, separation units including solids/solid separation units, gas/solid separation units, gas/liquid separation units, and the like. In some implementations the calcination and syngas production system 100 is controlled with a control system 999.

The system 100 is fed a solid feedstock stream 111 including solid carbonate material, where the solid carbonate material may include metals such as calcium, potassium, magnesium, sodium, uranium, aluminum, titanium, nickel, iron, copper, zinc, lead, manganese, strontium, cobalt, cadmium, bismuth, barium and the like. In some implementations, the feedstock stream 111 further comprises potassium, which may serve as a promotor or a catalyst for RWGS reactions.

Furthermore, the integrated calcination and syngas production system 100 may be fed one or more additional feedstocks such as hydrogen, oxygen (e.g., in the case of POR), water, methane and/or other hydrocarbons, separately (not shown) or combined as feedstock stream 121.

The feedstocks are fed to the integrated calcination and syngas production system 100, along with heat stream 119, wherein calcination and syngas reactions take place to produce solid metal oxide and syngas (including one or more of CO, $H_2$, $H_2O$ and $CO_2$) products. In some aspects, the SGC reactor operates within a temperature range of about 400° C. to 1600° C., 700° C. to 950° C., or 800° C. to 950° C. and a pressure range of about atmospheric to 100 bar, between approximately atmospheric and 10 bar, between 10 bar and 30 bar.

In some aspects, the hydrogen feedstock 121 for system 100 may be sourced from an electrically driven electrolysis system, such as alkaline electrolysis, proton exchange membrane (also known as a polymer electrolyte membrane) (PEM), electrolysis hydrogen production and fuel cell technologies, and solid oxide electrolysis cell (SOEC) electrolysis. In some aspects the hydrogen feedstock may be sourced from other processes such as chlor-alkali and methane reforming or cracking processes.

The integrated calcination and syngas production system 100 can include a catalytically active material that is involved in the syngas production reactions. In some aspects, the catalytically active material may include elements such as nickel, copper, platinum, gold, iron, cobalt, ruthenium, rhodium, zinc, magnesium, calcium, aluminum, titanium, cerium, palladium and indium. In some aspects these elements may be in their reduced (metallic) or oxidized (metal oxide) form. In some aspects, the catalytically active material includes a carbonate material, where the carbonate material may include metals such as calcium, potassium, magnesium, sodium, uranium, aluminum, titanium, nickel, iron, copper, zinc, lead, manganese, strontium, cobalt, cadmium, bismuth, barium and the like.

In some aspects, at least a portion of the catalytically active material is contained within the integrated calcination and syngas production system 100. In some aspects, at least a portion of the catalytically active material can also be fed separately as stream 113, or combined with at least one of the solid feedstock stream 111 and hydrogen feedstock stream 121. In these aspects, at least a portion of the catalytically active material would then leave the integrated calcination and syngas production system 100 along with the other solid streams being transferred out of the system, for example as part of the solid oxide stream 115. In some aspects, the catalytically active material may be fed as a one-time batch to the system 100, and discharged, regenerated and/or replaced on an intermittent basis.

In some aspects, the integrated calcination syngas production system 100 may operate partially or fully on renewable energy. In some aspects, the heat stream 119 provided to system 100 may be electrically sourced. In some aspects, the electrically sourced heat may be generated through resistance or induction methods, or a combination of the two. For example, heat may be produced by electrical elements, resistance wires, arc furnace configurations and the like. In some aspects, the electricity supplied to the system 100 can be produced from renewable energy, such as wind, solar, hydro, nuclear or a combination thereof. Optionally, heat stream 119 may be provided by oxy-combustion or air-combustion of a fuel, such as hydrogen, hydrocarbons (e.g., from a downstream unit such as a Fischer Tropsch unit), natural gas, or a combination thereof.

In some aspects, oxy-combustion used for provision of a heat stream 119 to system 100 can be conducted within an SGC reactor of the system 100. In some aspects, heat stream 119 can be provided to system 100 by a combination of electrical heating and oxy-combustion or air combustion of a fuel, such as hydrogen, hydrocarbons (e.g., from a downstream unit such as a Fischer Tropsch unit), natural gas, or a combination thereof. In some aspects, combining electrical heating with oxy-combustion can be used to reduce the electrical heat requirements of system 100.

In some implementations when one or more of the $H_2$, oxygen (e.g., in the case of POR), water, $CH_4$, other hydrocarbons, or any combination thereof are fed to the SGC reactor either separately or combined as feedstock stream 121, in addition to the solid feed stream 111, the integrated calciner and syngas production system 100 would then include at least a portion of reverse water gas shift (RWGS) reactions, steam methane reforming (SMR), dry methane reforming (DMR), Partial oxidation reforming (POR) or a combination thereof, to produce the syngas product stream 117.

In some aspects, using hydrogen sources other than or instead of $H_2$, such as $CH_4$, natural gas, hydrocarbons, steam or a combination thereof, may be more economic than using only $H_2$ in the feedstock stream 121. For example, in the aspects when the $H_2$ is produced from an electrically driven unit, such as an electrolyzer, and the electricity is expensive or even unavailable.

Figure 2:
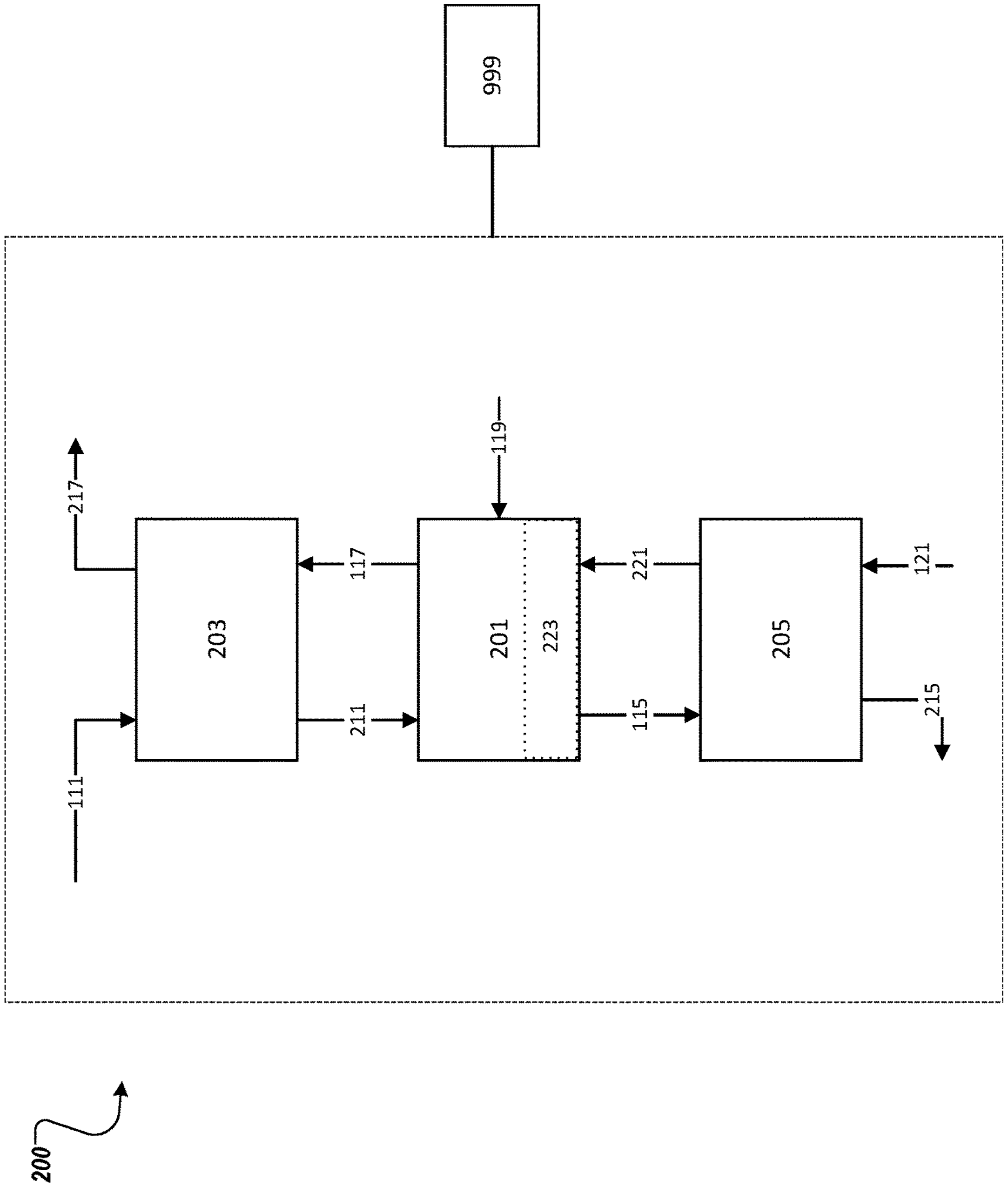
FIG. 2 is a schematic block diagram of an example integrated calcination and syngas production system for converting carbonate material to carbon monoxide including a portion of fixed catalytically active material.

Referring to FIG. 2, carbonate conversion to carbon monoxide is described with respect to illustrative integrated calcination and syngas production system 200. In some implementations, the integrated calcination and syngas production system 200 includes a syngas generating calciner (SGC) reactor 201, a heat exchanger 203 and a products cooler 205. In some aspects, the SGC reactor 201 can include one or more of a shaft kiln, rotary kiln, fluidized bed calciner or any other standard/known furnace or calciner. In some implementations the SGC reactor can include one or more of a packed or structured catalyst bed section 223. In some implementations the calcination and syngas production system 200 is controlled with a control system 999.

In this implementation, the solid feedstock stream 111 is first mixed together with the syngas product stream 117 from the SGC reactor 201 in the feed heat exchanger 203 in order to transfer at least a portion of the sensible heat within the syngas product stream to the carbonate stream. The resulting cooled syngas exits the feed heat exchanger 203 as stream 217, and the heated carbonate stream 211 is transferred to the SGC reactor 201. In some aspects, the SGC reactor 201 operates within a temperature range of about 400° C. to 1600° C., 700° C. to 950° C., or 800° C. to 950° C., and a pressure range of about atmospheric to 100 bar, between approximately atmospheric and 10 bar, between 10 bar and 30 bar.

In some aspects, the SGC reactor 201 includes catalytically active material and the catalytically active material may be applied as a coat on at least a portion of the internal surfaces of the SGC reactor 201, as an integral part of the vessel structure (e.g., walls, fins, any exposed electric elements), as part of the packed or structured catalyst bed 223, or a combination of any of the above, and remain within the vessel rather than move through the vessel with the solid material streams. In some implementations, the composition of the internal surfaces of the reaction vessel may include the catalytically actively material. In some implementations, at least a portion of the reaction vessel includes an open metal foam, such as Ni foam. In some aspects, the open metal foam includes an open, porous structure that could provide enhanced surface area. In some aspects, the enhanced surface area could provide an interface for the catalyst and reactants within the SGC reactor. In some aspects, the open metal foam could include materials such as NOVAMET open cell nickel foam. In some aspects, the open metal foam could be attached to at least a portion of the reactor internals, for example it could be attached to the inside cladding. In some implementations, reactants entering the reactor vessel are forced to pass through a metal foam attached to the internal surfaces of the reaction vessel.

Once fed to the SGC reactor 201, along with heat stream 119, the heated carbonate material in stream 211 undergoes calcination to produce a solid oxide product and gaseous $CO_2$. The $CO_2$ produced then reacts with reactants in feedstock stream 221 in the presence of the catalytically active material to form CO and $H_2O$. The product CO, along with any water and unreacted $H_2$ and $CO_2$, exits the SGC reactor 201 as hot syngas product stream 117, where it is then passed through the feed heat exchanger 203 to preheat the solid feedstock carbonate stream 111. The hot solid oxide produced by the calcination of the carbonate exits the reactor 201 as stream 115.

In some aspects, the hot solid oxide stream that exits the reactor 201 as stream 115 is cooled in a cooler 205. In some aspects, cooler 205 may be directly or indirectly cooled, and is used to transfer at least a portion of the sensible heat of the hot solid oxide stream 115 to the feedstock stream 121. The preheated feedstock stream exits the cooler 205 as stream 221 and is fed into the SGC reactor 201, while the cooled solid oxide exits the cooler 205 as stream 215 and can be sent to downstream processing units.

In some implementations when one or more of the $H_2$, oxygen (e.g., in the case of POR), water, $CH_4$, other hydrocarbons, or any combination thereof are fed to the SGC reactor 201 either separately or combined as feedstock stream 121, in addition to the preheated carbonate feed stream 211, the SGC reactor unit 201 would then include one or more of the syngas production reactions (RWGS, SMR, POR, and DMR), to produce the syngas product stream 117. In some aspects, using feedstock in addition to or instead of $H_2$, such as $CH_4$, natural gas, hydrocarbons, steam or a combination thereof, may be more economic than using only $H_2$ in the feedstock stream 121, for example, in the aspects when the $H_2$ is produced from an electrically driven unit, such as an electrolyzer, and the electricity is expensive or even unavailable.

In some aspects, the feed heat exchanger 203 may be a ceramic heat exchanger, as common metal and alloy heat exchangers exposed to the hot syngas stream conditions and temperatures can be prone to metal dusting issues, where as ceramic heat exchange materials are not prone to metal dusting. Metal dusting is a common problem in syngas and reforming processes when metal or alloy surfaces, for example mild steel, stainless steel, iron and nickel based alloys, are exposed to the process operating conditions. The result is a deterioration in the metal material, ultimately requiring replacement. Industry typically reduces metal dusting issues by cooling the gas streams to temperatures where metal dusting does not occur—this can result in wasted energy and low process efficiencies.

In some implementations that include rotary kiln vessels, the heat exchange unit 203 and product cooling unit 205 may include known heat exchange equipment that is typically used in rotary kiln systems, for example, any heat exchanger types commonly used in the pulp & paper and cement industries and as described earlier.

In some aspects, the system 200 can be operated such that at least a portion of the energy requirements, including heat stream 119, are provided by electricity. In some aspects, the heat stream 119 provided to system 200 may be electrically sourced, and the electrically sourced heat may be generated through resistance or induction methods, or a combination of the two. In some aspects, the integrated calcination syngas production system 200 may operate partially or fully on renewable energy, including sources such as wind, solar, hydro, nuclear or a combination thereof. Optionally, heat stream 119 may be provided by oxy-combustion or air-combustion of a fuel, such as hydrogen, hydrocarbons (e.g., from a downstream unit such as a Fischer Tropsch unit), natural gas, or a combination thereof.

In some aspects, oxy-combustion used for provision of a heat stream 119 to system 200 can be conducted within an SGC reactor of the system 200. In some aspects, heat stream 119 can be provided to system 200 by a combination of electrical heating and oxy-combustion or air combustion of a fuel, such as hydrogen, hydrocarbons (e.g., from a downstream unit such as a Fischer Tropsch unit), natural gas, or a combination thereof. In some aspects, combining electrical heating with oxy-combustion can be used to reduce the electrical heat requirements of system 200.

Figure 5:
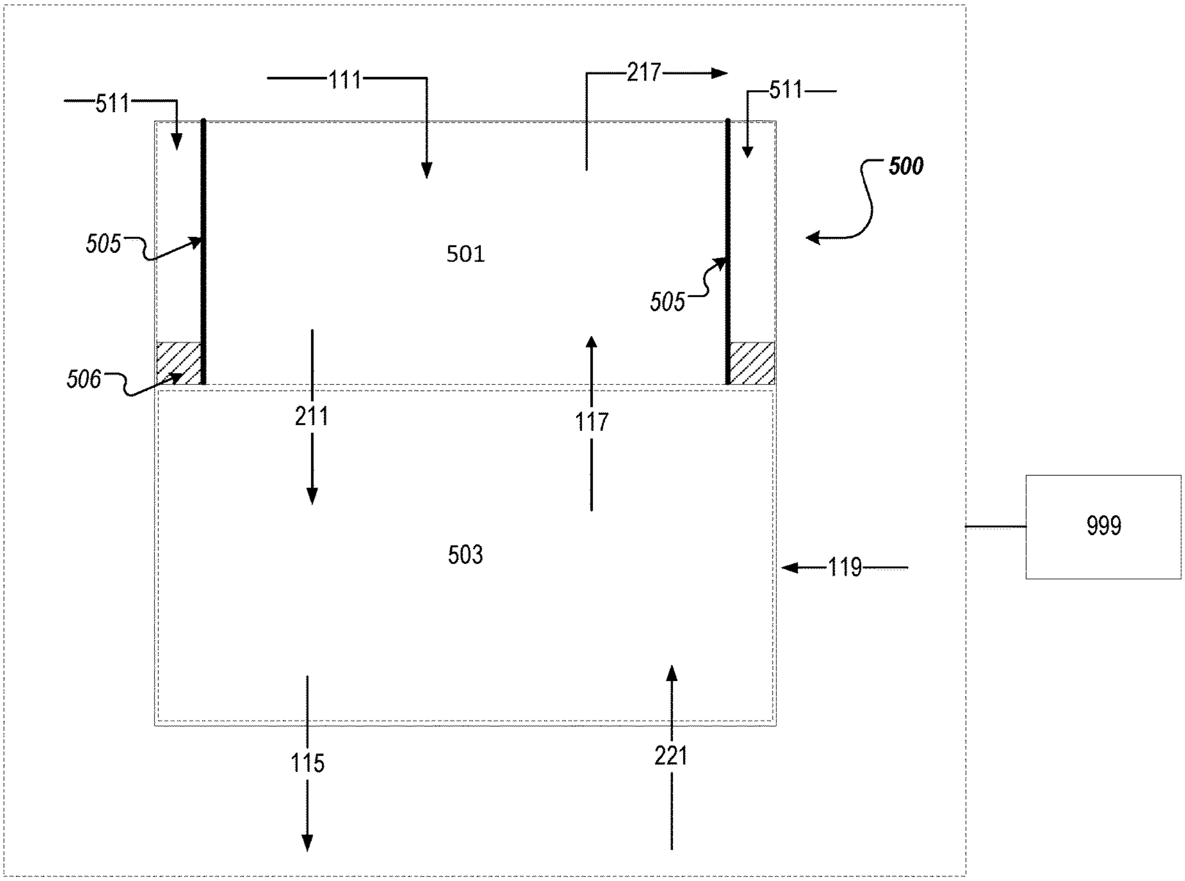
FIG. 5 is a schematic block diagram of an example integrated calcination and syngas production system for converting carbonate material to carbon monoxide including integrated heating zones.

As shown in FIG. 5, in some aspects, the SGC reactor 500 includes an integrated heating zone 501, and a reaction zone 503. In some aspects, the heating zone 501 includes a heat exchanger. In some aspects, a ceramic material 505 is inserted in or lines the internal walls of the integrated heating zone 501. In some implementations the SGC reactor 500 is controlled with a control system 999.

In some aspects, a gas stream 511 is provided to the SGC reactor 500 to fill the space between the walls of the SGC reactor 500 and the ceramic material 505 of the integrated heating zone 501. In some aspects, the gas stream includes $H_2$, steam, $N_2$, or a combination thereof. In some aspects, the SGC reactor 500 is designed to prevent flow of reaction products (e.g. components from syngas product stream 117) from entering the cavity between the internal walls of the integrated heating zone 501 and the ceramic material 505. In some aspects this design includes one or more of a positive pressure condition in the cavity, a material barrier 506 or a combination thereof. The positive pressure acts to purge cavity gas out into SGC reactor to prevent reaction products from entering the cavity. In some aspects, the material barrier 506 includes a permeable membrane, such as cerawool. In some aspects, the material barrier 506 may be attached to or part of the ceramic material 505. In some aspects the material barrier 506 may be separate material connected to internal walls of the integrated heating zone 501.

Figure 7:
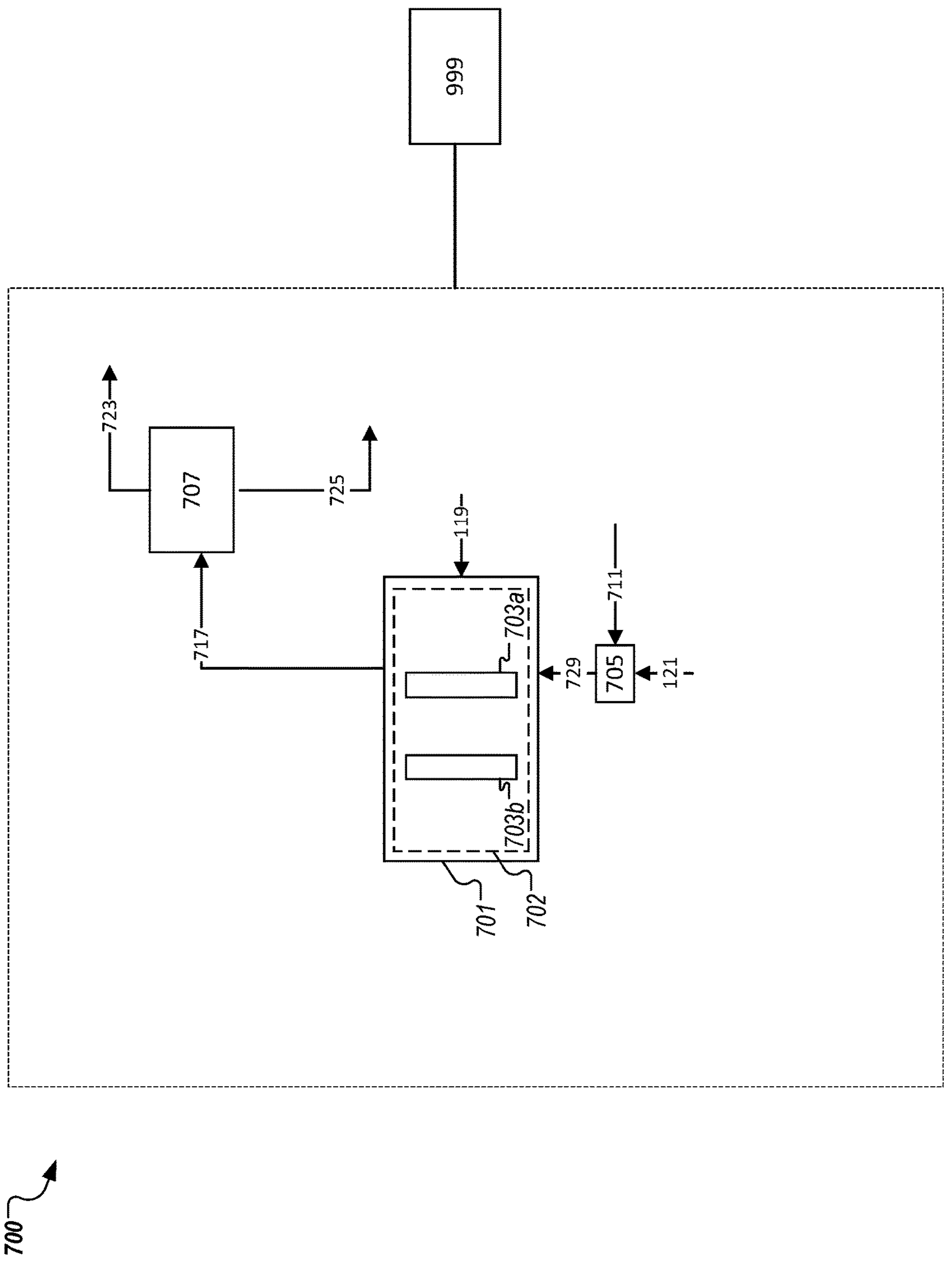
FIG. 7 is a schematic block diagram of an example integrated calcination and syngas production system for converting carbonate material to carbon monoxide including reactor tubes.

As shown in FIG. 7, in some aspects, the calcination and syngas production system 700 includes an SGC reactor 701. In some aspects the SGC reactor 701 includes an insulated enclosure 702. In some aspects the insulated enclosure 702 could include a furnace box. In some aspects the insulated enclosure 702 could include one or more reactor tubes 703*a*, 703*b*. In some aspects, the calcination and syngas production system 700 includes a feed introduction unit 705 and a high temperature solids separation unit 707. In some implementations the calcination and syngas production system 700 is controlled with a control system 999.

In some aspects the feed introduction unit 705 includes componentry to add lower pressure gases, and/or solids into the system, and may include componentry such as blowers, lock hoppers, screw feeders, rotary valves, eductors or a combination thereof. In some cases the feed introduction unit 705 may include one or more of the above components in a series to add multiple feed streams.

In some aspects, the insulated enclosure 702 includes electrical heating elements. In some aspects, at least a portion of the reactor tubes 703*a*, 703*b* are filled with catalyst material, including but not limited to packing, metal particles, hollow metal spheres, metal ball bearings, and the like. In some implementations, the catalyst material filling the reactor tubes 703*a*, 703*b* is composed of a material high in Ni.

In some aspects, the gaseous feedstock stream 121 is provided to the feed introduction unit 705 prior to entry into the SGC reactor 701. In some aspects, a solid feedstock stream is provided to the feed introduction unit 705. In some implementations the solid feedstock stream 711 may include carbonates. In some implementations, the solid feedstock stream 711 is provided as a lime mud stream. In some aspects, the feed introduction unit 705 combines the feedstock stream 121 and the solid feedstock stream 711 and provides a combined stream 729 to the reactor tubes 703*a*, 703*b* of the SGC reactor 701. In some aspects, the flowing combined stream 729 sets up a bubbling fluidized bed of the catalyst material contained within the reactor tubes 703*a*, 703*b*. In some implementations, the bubbling fluidized bed created by the combined stream 729 flowing through the catalyst material moves the heat from the walls of the reactor tubes 703*a*, 703*b* to the solid feedstock contained with the combined stream 729. In some implementations, the catalyst material contained within the reactor tubes 703*a*, 703*b* provides catalytic surfaces for syngas production reactions, such as reverse water gas shift (RWGS) reactions. In some implementations, a recycle stream (not shown) may be added to the feedstock stream 121 to reduce the partial pressure of $CO_2$ in the SGC reactor 701, in order to push the syngas production reactions and increase the residence time for the syngas production reactions to complete. For example, a portion of the syngas stream 723 may be recycled (not shown) with the feedstock stream 121 in the feed introduction unit 705. In some aspects the portion of syngas stream recycled may be introduced in series with the solid feed stream 711. For example, the recycle stream may be introduced using an eductor, and the combined recycle stream plus stream 121 is then fed into a second eductor in which stream 711 is fed (not shown).

In some aspects, solid oxide and syngas produced by the syngas production reaction in the SGC reactor 701 flow out of the reactor tubes 703*a*, 703*b* as product stream 717 into the high temperature solids separation unit 707. In some aspects, the high temperature solids separation unit 707 includes a cyclone, a baghouse or a combination thereof. The solids separation unit 707 separates product stream 717 into a syngas stream 723 and a solid oxide stream 725. In some implementations the solid oxide may include at least a portion of calcium oxide, unreacted calcium carbonate or a combination thereof. In some implementations, the high temperature solids separation unit 707 is provided as a cyclone.

In some aspects, the system 700 can be operated such that at least a portion of the energy requirements, including heat stream 119, are provided by electricity. In some aspects, the heat stream 119 provided to system 700 may be electrically sourced, and the electrically sourced heat may be generated through resistance or induction methods, or a combination of the two. In some aspects, the integrated calcination syngas production system 700 may operate partially or fully on renewable energy, including sources such as wind, solar, hydro, nuclear or a combination thereof. Optionally, heat stream 119 may be provided by oxy-combustion or air-combustion of a fuel, such as hydrogen, hydrocarbons (e.g., from a downstream unit such as a Fischer Tropsch unit), natural gas, or a combination thereof. In some aspects, oxy-combustion used for provision of a heat stream 119 to system 700 can be conducted within an SGC reactor 701 of the system 700. In some aspects, heat stream 119 can be provided to SGC reactor 701 by a combination of electrical heating and oxy-combustion or air combustion of a fuel, such as hydrogen, hydrocarbons (e.g., from a downstream unit such as a Fischer Tropsch unit), natural gas, or a combination thereof. In some aspects, combining electrical heating with oxy-combustion can be used to reduce the electrical heat requirements of system 700.

Figure 3:
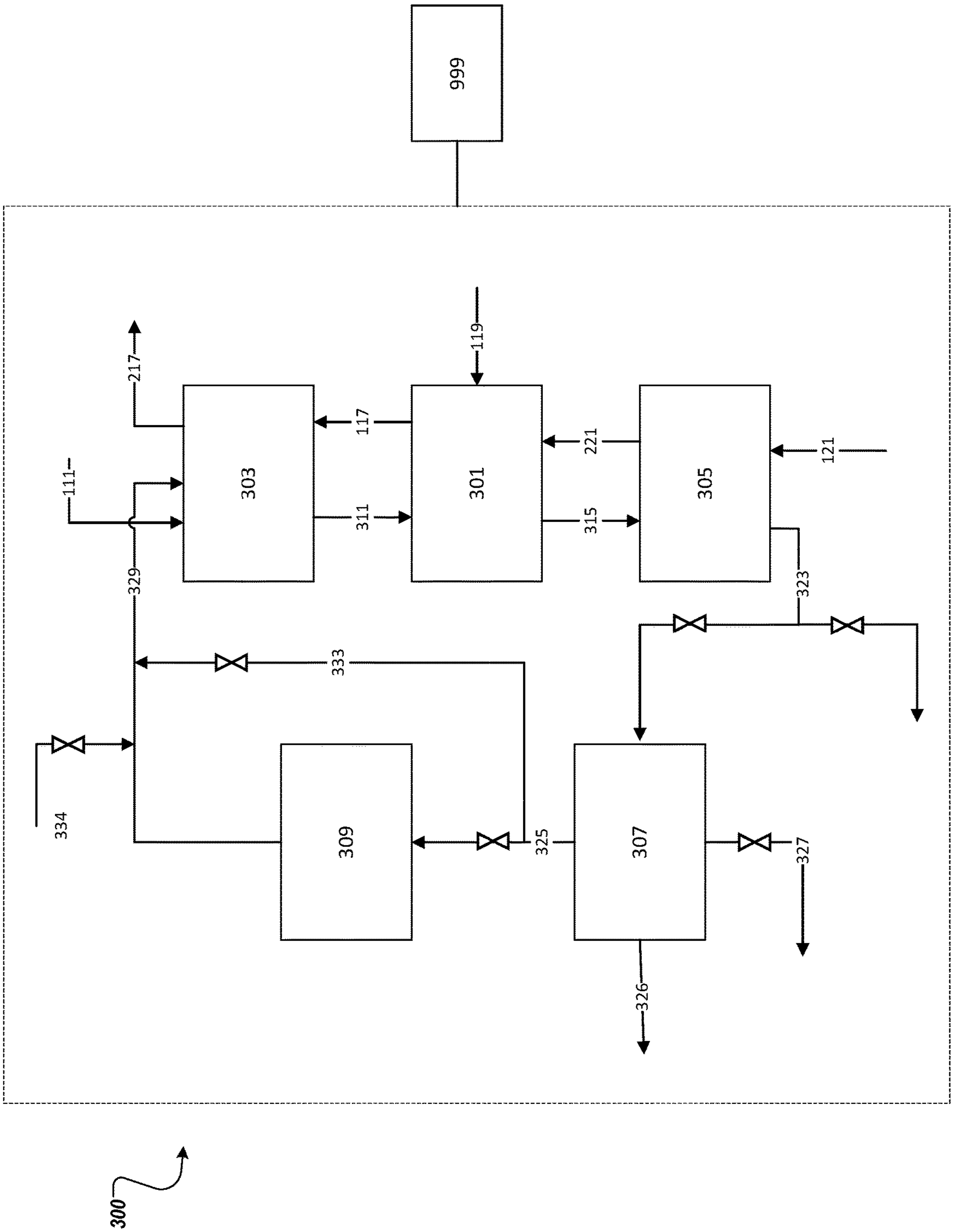
FIG. 3 is a schematic block diagram of an example integrated calcination and syngas production system for converting carbonate material to carbon monoxide including a recycled stream of catalytically active material.

Referring to FIG. 3, carbonate conversion to carbon monoxide is described with respect to illustrative integrated calcination and syngas production system 300. In some implementations, the system 300 includes an SGC reactor 301, a feed heat exchanger 303 a products cooler unit 305, and may optionally include solids handling equipment, such as, a solids separation unit 307 and a catalyst regeneration unit 309. In this implementation, at least a portion of the catalytically active material is recycled through the integrated calcination and syngas production system 300. In some implementations the calcination and syngas production system 300 is controlled with a control system 999.

In some aspects, the SGC reactor 301 can include one or more of a shaft kiln, rotary kiln, fluidized bed calciner or any other standard/known furnace or calciner. At least a portion of the catalytically active material is introduced to the SGC reactor 301, by feeding either separately as stream 329 or combined with the other solid feed stream 111 into the SGC reactor 301 in a semi-continuous or continuous manner. In some aspects, the SGC reactor operates within a temperature range of about 400° C. to 1600° C., and a pressure range of about atmospheric to 100 bar. In this implementation, the catalytically active material leaves the SGC reactor 301 with the solid product material as mixed material stream 315.

In some aspects, the solid feedstock stream 111 and a catalytically active stream 329 are fed with the hot syngas product stream 117 into the heat exchanger 303 in order to transfer at least a portion of the sensible heat within the syngas product stream 117 to the solid carbonate feedstock and catalytically active material streams 111 and 329, respectively. The resulting mixed and heated solid stream 311, which includes at least a portion of the carbonate and catalytically active material, leaves the feed heat exchanger 303 and is transferred to the SGC reactor 301.

In some aspects, the SGC reactor 301 includes catalytically active material and, optionally, the catalytically active material may be applied as a coat on at least a portion of the internal surfaces of the SGC reactor 301, as an integral part of the SGC reactor vessel structure (e.g., walls, fins, any exposed electric elements), as a catalyst bed, or a combination of any of the above, and remain within the vessel rather than move through the vessel with the solid material streams. In some implementations, the composition of the internal surfaces of the SGC reactor vessel may include the catalytically actively material. In some implementations, at least a portion of the SGC reactor vessel includes an open metal foam, such as Ni foam. In some aspects, the open metal foam includes an open, porous structure that could provide enhanced surface area. In some aspects, the enhanced surface area could provide an interface for the catalyst and reactants within the SGC reactor. In some aspects, the open metal foam could include materials such as NOVAMET open cell nickel foam. In some aspects, the open metal foam could be attached to at least a portion of the SGC reactor internals, for example it could be attached to the inside cladding. In some implementations, reactants entering the SGC reactor vessel are forced to pass through a metal foam attached to the internal surfaces of the reaction vessel.

Once fed to the SGC reactor 301, along with heat stream 119, the carbonate material undergoes calcination to produce a solid oxide product and gaseous $CO_2$. The $CO_2$ produced then reacts with the feedstock stream 221 in the presence of the catalytically active material to form CO and $H_2O$. The product CO, along with $H_2O$ and any unreacted $H_2$ and $CO_2$ exits the SGC reactor 301 as hot syngas product stream 117. The hot syngas product stream 117 is then passed through the feed heat exchanger 303 to preheat the solid feed stock carbonate stream 111 and catalytically active material stream 329. The solid oxide calcination product, and at least a portion of the catalytically active material exit the reactor 301 as stream 315.

The hot mixed solid stream 315 then exits the SGC reactor 301 and is cooled in cooler 305. In some aspects, cooler 305 may be a direct or indirect configuration, and is used to transfer at least a portion of the sensible heat of the hot mixed solid stream 315 to the feedstock stream 121. The preheated feedstock stream exits the cooler 305 as stream 221 and is fed into the SGC reactor 301, while the cooled solid material exits the cooler unit 305 as stream 323. In some aspects, the catalytically active material may stay with the solid oxide material and be sent to downstream processes, wherein a portion of it may be separated and collected for recycling or disposal, and/or a portion of it may cycle all the way through the process along with the solid material, such that it ends up coming back to the feed stream of the integrated calcination and syngas production system 300.

Optionally, the integrated calcination and syngas production system 300 may include a solids separation unit 307 downstream of the cooler 305, which is used to isolate the catalytically active material from the other solid material in stream 323. In some aspects, at least a portion of the catalytically active material may be physically different than the other solid material and may be separated based on those physical differences, for example size, density, shape and the like. In some aspects, the catalytically active material may have electromagnetic properties enabling it to be separated from the other solid material using electromagnetic separation techniques. The separated catalytically active material stream 325 may then be recycled back as feed into the integrated calcination and syngas production system 300 and the separated solid oxide material stream 327 can be sent to downstream and/or offsite processes. The catalytically inactive material can be removed as purge stream 326, and sent for disposal, downstream treatment or a combination of both.

In some aspects, the separated catalytically active material stream 325 may be sent directly to the integrated calcination and syngas production system 300 as stream 333. Optionally, a portion of the stream 325 may be first regenerated in the catalyst regeneration unit 309 before being recycled as stream 329 to the SGC reactor 301 via the heat exchanger unit 303.

In some aspects, a catalytically active material make-up stream 334 may be required to replace catalytic material, for example in aspects where the catalytically active material has been lost or removed from the system or has been degraded or deactivated.

In some implementations when one or more of the $H_2$, oxygen (e.g., in the case of POR), water, $CH_4$, other hydrocarbons, or any combination thereof are fed to the SGC reactor 301 either separately or combined as feedstock stream 121, in addition to the carbonate feed stream 111, the SGC reactor unit 301 would then include one or more of the syngas production reactions (RWGS, SMR, POR and DMR), to produce the syngas product stream 117. In some aspects, using feedstock in addition to or instead of $H_2$, such as $CH_4$, natural gas, hydrocarbons, steam or a combination thereof, may be more economic than using only $H_2$ in the feedstock stream 121. For example, in the aspects when the $H_2$ is produced from an electrically driven unit, such as an electrolyzer, and the electricity is expensive or even unavailable.

In some aspects, the feed heat exchanger 303 may be a ceramic heat exchanger, as common metal and alloy heat exchangers exposed to the hot syngas stream conditions and temperatures can be prone to metal dusting issues, where as ceramic heat exchange materials are not prone to metal dusting. Metal dusting is a common problem in syngas and reforming processes when metal or alloy surfaces, for example mild steel, stainless steel, iron and nickel based alloys, are exposed to the process operating conditions. The result is a deterioration in the metal material, ultimately requiring replacement. Industry typically reduces metal dusting issues by cooling the gas streams to temperatures where metal dusting does not occur—this results in wasted energy and low process efficiencies. In some aspects, the heat exchanger 303 is integrated with the SGC reactor 301, as shown in FIG. 5, wherein, the SGC reactor includes an integrated heating zone and an integrated reaction zone.

In some implementations that include rotary kiln vessels, the heat and cooling units may include known heat exchange equipment that is typically used in rotary kiln systems, for example types commonly used in the pulp & paper and cement industries, as described earlier.

In some aspects, the system 300 can be operated such that all energy requirements including heat stream 119, are provided by electricity. In some aspects, the heat stream 119 provided to system 300 may be electrically sourced, and the electrically sourced heat may be generated through resistance or induction methods, or a combination of the two. In some aspects, the integrated calcination syngas production system 300 may operate partially or fully on renewable energy, including sources such as wind, solar, hydro, nuclear or a combination thereof. Optionally, heat stream 119 may be provided by oxy-combustion or air-combustion of a fuel, such as hydrogen, hydrocarbons (e.g., from a downstream unit such as a Fischer Tropsch unit), natural gas, or a combination thereof.

In some aspects, oxy-combustion used for provision of a heat stream 119 to system 300 can be conducted within an SGC reactor of the system 300. In some aspects, heat stream 119 can be provided to system 300 by a combination of electrical heating and oxy-combustion or air combustion of a fuel, such as hydrogen, hydrocarbons (e.g., from a downstream unit such as a Fischer Tropsch unit), natural gas, or a combination thereof. In some aspects, combining electrical heating with oxy-combustion can be used to reduce the electrical heat requirements of system 300.

Figure 4:
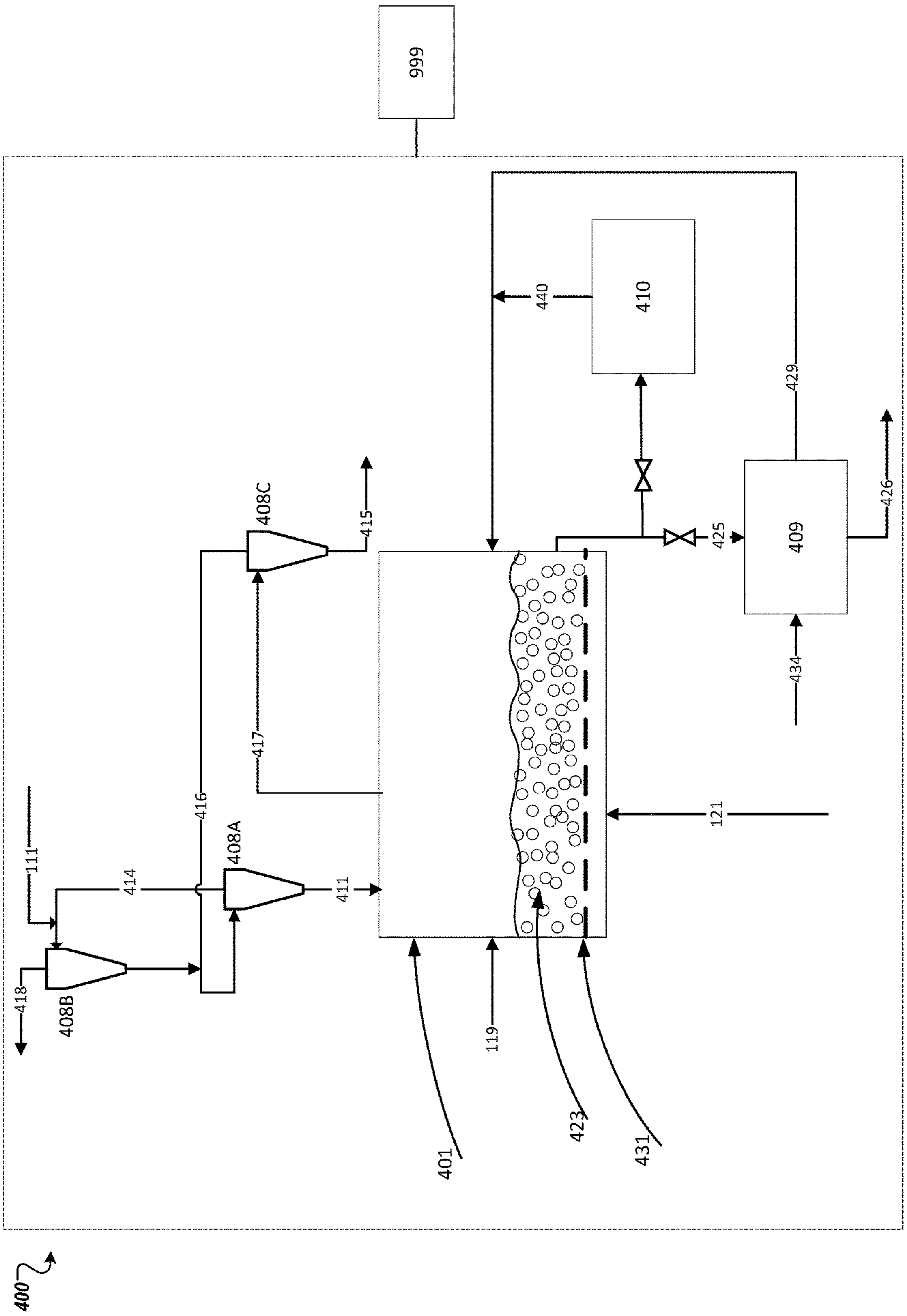
FIG. 4 is a schematic block diagram of an example integrated calcination and syngas production system for converting carbonate material to carbon monoxide including a fluidized bed system.

Referring to FIG. 4, carbonate conversion to carbon monoxide is described with respect to illustrative integrated calcination and syngas production system 400. In some implementations, the system 400 includes a fluidized bed SGC reactor unit 401, a catalyst clean-up unit 409, a heating device 410, a solids recovery cyclone 408C and and can also include components such as one or more staged heat cyclones 408A and 408B. In some implementations the calcination and syngas production system 400 is controlled with a control system 999.

The fluidized bed SGC reactor 401 operates within a temperature range of approximately 400° C. to 1600° C. and pressures between approximately atmospheric up to about 100 bar. The fluidized bed SGC reactor 401 may include componentry such as a distributer plate 431, and a bubbling fluidized bed (BFB) of catalytically active material 423. In some aspects, the bubbling bed catalyst zone 423 is fluidized with a gaseous feedstock stream 121, which may include one or more feed reactants such as $H_2$, oxygen (e.g., in the case of POR), steam, $CH_4$, natural gas, other hydrocarbons or a combination thereof.

The stream 121 enters the fluidized bed SGC reactor 401 near the bottom portion of the vessel, through a distributor plate 431 and flows up through the catalyst bed zone 423, where it fluidizes and mixes with both the solid carbonate and oxide material as well as the catalytically active bed material. In some implementations, the catalytically active material may be applied as a coat on at least a portion of the internal surfaces of the fluidized bed SGC reactor 401, as an integral part of the vessel structure (e.g., walls, fins, any exposed electric elements), and remain within the vessel rather than move through the vessel with the solid material streams. In some implementations, the composition of the internal surfaces of the fluidized bed SGC reactor vessel may include the catalytically actively material.

In some aspects, the solid feedstock stream 111 can first be preheated, for example directly by the fluidized bed SGC reactor product syngas streams 416 and 414 in one or more of cyclones 408A and 408B respectively, prior to entering the fluidized bed SGC reactor 401 as preheated carbonate stream 411. Heat is supplied to the fluidized bed SGC reactor unit 401 via a general heat stream 119, heated catalytically active material via stream 440, or a combination of the two. The preheated carbonate material 411 undergoes calcination within the fluidized bed SGC reactor unit 401 to produce a solid oxide material and gaseous $CO_2$. The $CO_2$ produced reacts with the reactant components in the feedstock stream 121, for example $H_2$, oxygen (e.g., in the case of POR), steam, $CH_4$ or other hydrocarbons, in the presence of the bubbling catalyst bed 423 to form CO and $H_2O$. The CO along with any $CH_4$, $H_2$, $CO_2$, $H_2O$, and solid oxide exits the fluidized bed SGC reactor 401 as hot product stream 417, where it is then passed through the solids recovery cyclone 408C to separate the solid oxide from the syngas. The solid oxide is removed as stream 415 from the cyclone 408C and the hot syngas stream 416 is sent to the heating cyclones 408A and 408B to preheat the solid feedstock stream 111. The cooled syngas exits the cyclone 408B as stream 418.

In some aspects, at least a portion of the solid oxide material has different density and/or particle size and hence different fluidization properties compared to the catalytically active bed material. For example, while the catalytically active bed material fluidizes in a bubbling bed regime at a given fluidization velocity, the solid oxide material may fluidize in a transport regime at the same given velocity, allowing it to be transported out of the fluidized bed SGC reactor 401.

In some aspects, the catalytically active material bed 423 can be discharged on a periodic or continuous basis from the fluidized bed SGC reactor 401, as discharge stream 425. Optionally, a portion of the discharge stream 425 may be sent to a clean-up unit 409 for regeneration, a heating device 410, or a combination thereof. In some aspects, fresh catalyst makeup stream 434 can be added to the regeneration unit 409 and the cleaned catalytically active material is then recycled back to the fluidized bed SGC reactor 401 as stream 429. The catalytically inactive material can be removed as purge stream 426, and sent for disposal, downstream treatment or a combination of both. In some aspects, at least a portion of the discharge stream 425 may be preheated using a heating unit 410 before being recycled to the fluidized bed SGC reactor 401. The preheated catalytically active stream 440 can be recycled back along with the cleaned catalytic material stream 429 to the fluidized bed SGC reactor 401.

In some implementations when one or more of the $H_2$, oxygen (e.g., in the case of POR), water, $CH_4$, other hydrocarbons, or any combination thereof are fed to the SGC reactor 401 either separately or combined as feedstock stream 121, in addition to the solid carbonate feedstock stream 111, the SGC reactor unit 401 would then include one or more of the syngas production reactions (RWGS, SMR, POR, and DMR), to produce the product stream 417. In some aspects, using feedstock in addition to or instead of $H_2$, such as $CH_4$, natural gas, hydrocarbons, steam or a combination thereof, may be more economic than using only $H_2$ in the feedstock stream 121. For example, in the aspects when the $H_2$ is produced from an electrically driven unit, such as an electrolyzer, and the electricity is expensive or even unavailable.

In some aspects, the system 400 can be operated such that all energy requirements including heat stream 119, are provided by electricity. In some aspects, in one or more of the general heat stream 119 provided to fluidized bed SGC reactor 401 and the heating unit 410, the heat may be electrically sourced, and the electrically sourced heat may be generated through resistance or induction methods, or a combination of the two. In some aspects, the integrated calcination syngas production system 400 may operate partially or fully on renewable energy, including sources such as wind, solar, hydro, nuclear or a combination thereof. Optionally, one or more of the general heat source 119, and the heat provided via the heating unit 410, may be provided by oxy-combustion or air-combustion of a fuel, such as hydrogen, hydrocarbons (e.g., from a downstream unit such as a Fischer Tropsch unit), natural gas, or a combination thereof.

In some aspects, oxy-combustion used for provision of a heat stream 119 to system 400 can be conducted within the fluidized bed SGC reactor 401 of the system 400. In some aspects, heat stream 119 can be provided to system 400 by a combination of electrical heating and oxy-combustion or air combustion of a fuel, such as hydrogen, hydrocarbons (e.g., from a downstream unit such as a Fischer Tropsch unit), natural gas, or a combination thereof. In some aspects, combining electrical heating with oxy-combustion can be used to reduce the electrical heat requirements of system 400.

In some implementations, the integrated calciner and syngas production system 400 may optionally include the use of circulating solid material. In some aspects, the solid material may be designed with a shape, density, size or combination thereof to use in a desired fluidization regime. In some aspects, the solid material may be designed to enhance surface area. In some aspects, solid spheres or balls may be used. In some aspects the solid material may be constructed out of metal including for example nickel alloys. In some aspects, the solid material may include non-metal components, for example ceramic. In some aspects the solid material may be a combination, for example nickel coated ceramic balls. These implementations are based around existing calciner designs that incorporate a moving solid media bed which transfers heat from an external heating device into the calcination area using the sensible heat in an intermediate media (e.g. solid material).

In some implementations, this existing/known concept of using a moving heat media within a calciner unit is integrated with the concept of moving material that is catalytically active within syngas production systems, for example by using solid balls which contain or are coated with catalytically active materials, such previously mentioned. In some aspects, the moving media (e.g., balls) may be heated in a separate external heater unit, such as heater 410. Once heated, the moving media is transferred out of the fluidized bed heater and returned to the integrated fluidized bed calciner syngas production system 401.

In some aspects, the upward fluidization velocity through the fluidized bed calciner syngas production system 400 is selected such that the moving media are in a bubbling fluidized bed regime. The carbonate material is introduced into the fluidized bed SGC reactor 401 and travels through the bubbling bed 423. In the process of moving through the fluidized bed SGC reactor 401, the carbonate material calcines and releases $CO_2$ which is converted to CO by the presence of hydrogen feedstock in the fluidizing gas and the catalytically active material present in the heat transfer balls. The solids material, including the oxide and any unreacted carbonates elutriates out of the bubbling bed, and the cyclone 408C separates the solid material (e.g., CaO and any fluidized unreacted carbonate) from the gases. Optionally, the separated hot solid material may be used to preheat the fluidizing gas (not shown), and the hot gases may be used to preheat the carbonate material feed.

Figure 6A:
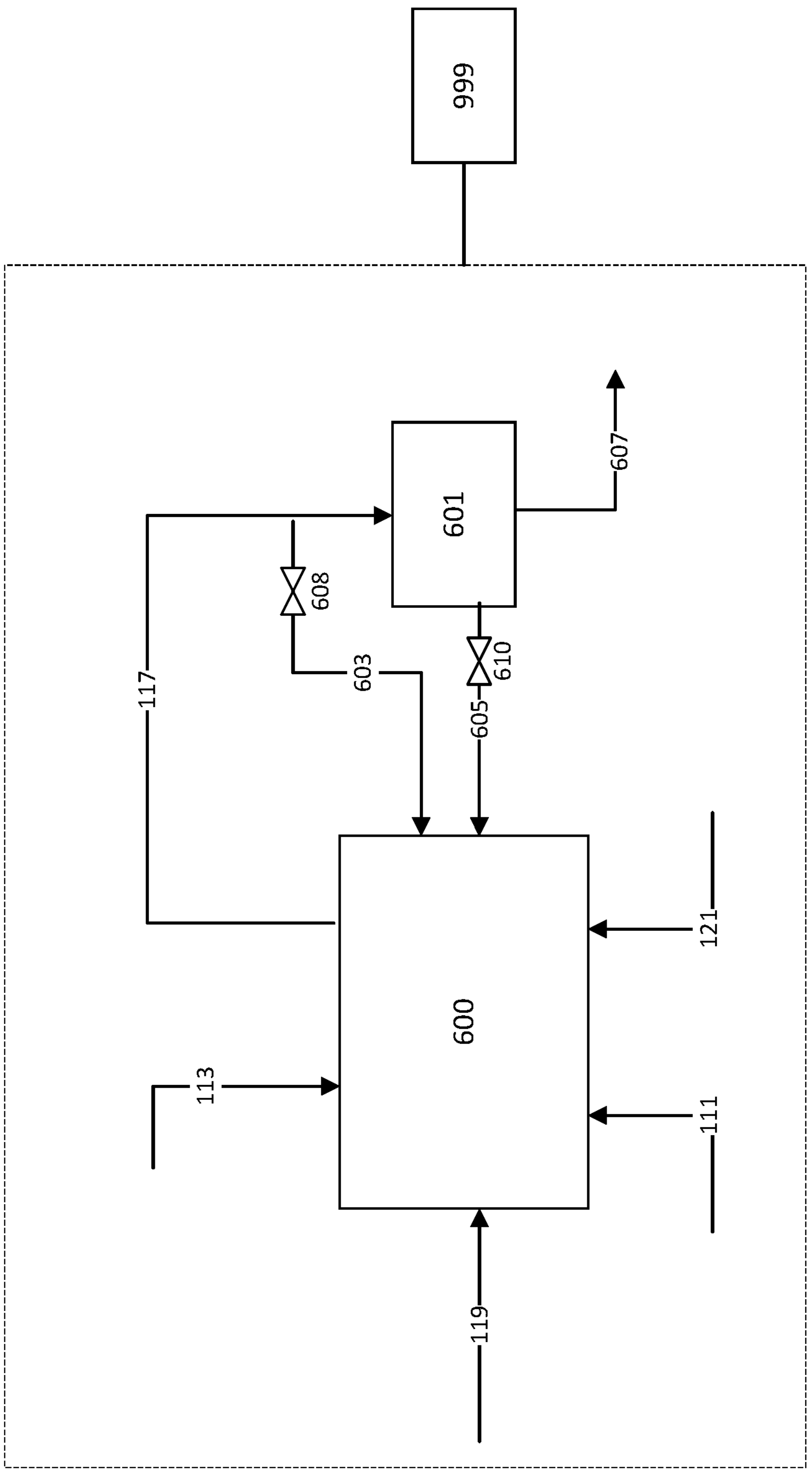
FIGS. 6A and 6B are schematic block diagrams of example integrated calcination and syngas production systems for converting carbonate material to carbon monoxide including one or more downstream units.

Referring to FIG. 6A, carbonate conversion to carbon monoxide is described with respect to illustrative integrated calcination and syngas production system 600. In some implementations, the system 600 includes a downstream unit 601, a first recycle stream 603, a second recycle stream 605, and a products stream 607. In some implementations the calcination and syngas production system 600 is controlled with a control system 999.

In some implementations, the downstream unit is a Fischer Tropsch unit. In some implementations, the first recycle stream 603 intersects the syngas product stream 117 and is provided to the SGC reactor. In some implementations, the second recycle stream 605 exits the downstream unit and is provided to the SGC reactor as a feed stream. In some implementations, the second recycle stream 605 includes CO, $CO_2$, $H_2$, $H_2O$, other light end hydrocarbons, or a combination thereof. In some implementations, the first recycle stream 603 and the second recycle stream 605 include valves 608 and 610, respectively. In some implementations, the valves on recycle stream 603 and recycle stream 605 can be used to control the flow of the respective streams into the SGC reactor.

In some implementations, at least a portion of the reaction vessel includes an open metal foam, such as Ni foam. In some aspects, the open metal foam includes an open, porous structure that could provide enhanced surface area. In some aspects, the enhanced surface area could provide an interface for the catalyst and reactants within the SGC reactor. In some aspects, the open metal foam could include materials such as NOVAMET open cell nickel foam. In some aspects, the open metal foam could be attached to at least a portion of the reactor internals, for example it could be attached to the inside cladding. In some implementations, reactants entering the reactor vessel are forced to pass through a metal foam attached to the internal surfaces of the reaction vessel.

In some aspects, the system 600 can be operated such that all energy requirements including heat stream 119, are provided by electricity. In some aspects, in one or more of the general heat stream 119 provided to the SGC reactor (not shown), the heat may be electrically sourced, and the electrically sourced heat may be generated through resistance or induction methods, or a combination of the two. In some aspects, the integrated calcination syngas production system 600 may operate partially or fully on renewable energy, including sources such as wind, solar, hydro, nuclear or a combination thereof. Optionally, one or more of the general heat source 119, and the heat provided via any heating units (not shown), may be provided by oxy-combustion or air-combustion of a fuel, such as hydrogen, hydrocarbons (e.g., from a downstream unit such as a Fischer Tropsch unit), natural gas, or a combination thereof.

In some aspects, oxy-combustion used for provision of a heat stream 119 to system 600 can be conducted within an SGC reactor of the system 600. In some aspects, heat stream 119 can be provided to system 600 by a combination of electrical heating and oxy-combustion or air combustion of a fuel, such as hydrogen, hydrocarbons (e.g., from a downstream unit such as a Fischer Tropsch unit), natural gas, or a combination thereof. In some aspects, combining electrical heating with oxy-combustion can be used to reduce the electrical heat requirements of system 600.

Figure 6B:
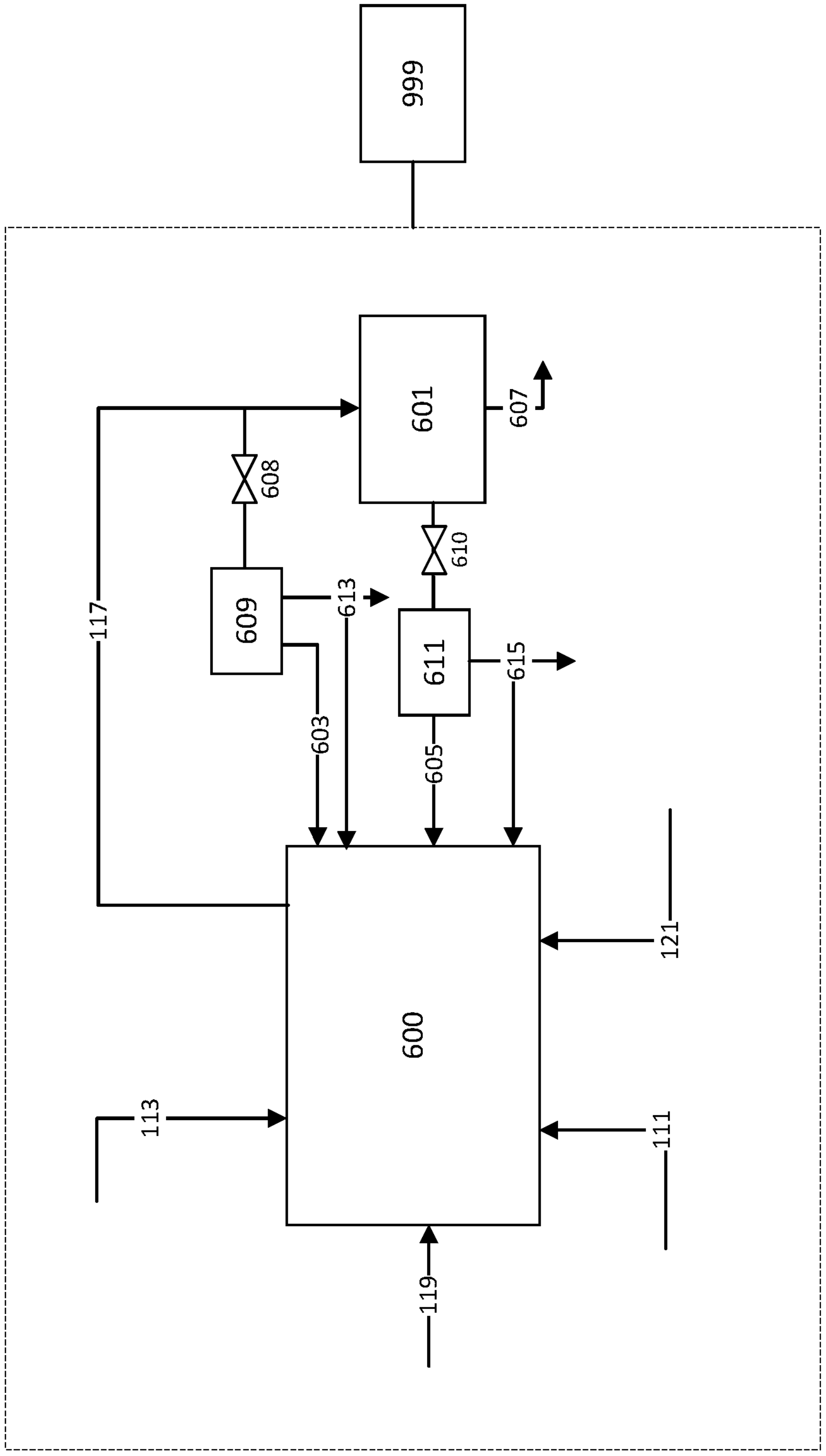

As depicted in FIG. 6B, in some implementations, integrated calcination and syngas production system 600 can also include a first process unit 609 and second process unit 611. In some implementations, first recycle stream 603 is processed by first process unit 609 prior to entry of the first recycle stream 603 into the SGC reactor. In some implementations, the first process unit 609 processes the first recycle stream 603 by adjusting the composition of the first recycle stream 603. For example, process unit 609 can remove water from stream 603. In some examples, the process unit 609 can adjust the $CO/H_2$ content of stream 603. Components removed from stream 603 by process unit 609 exit process unit 609 as discharge stream 613. Components removed from stream 605 by process unit 611 exit process unit 611 as discharge stream 615. In some aspects the process unit 609 may include a hydrogen separation membrane, water knockout, and the like. In some aspects, at least a portion of the components (e.g., water) removed in stream 613 could be sent back to system 600 and used for example in a boiler system. In some implementations, where the process unit 609 includes for example a hydrogen separation membrane, the hydrogen removed could be recycled to the system 600 and utilized as a fuel source, for example in an oxy-combustion process. In some implementations this can contribute to heat stream 119. In some implementations, second recycle stream 605 is processed by second process unit 611 prior to entry of the second recycle stream 605 into the SGC reactor. In some implementations, the second process unit 611 processes the second recycle stream 605 by adjusting the composition of the second recycle stream 605. For example, process unit 611 can remove water from stream 605. In some aspects, at least a portion of the components (e.g. water) removed in stream 615 could be sent back to system 600 and used for example in a boiler system. In some examples, the process unit 611 can adjust the $CO/H_2$ content of stream 605. In some aspects the process unit 611 may include a separation unit, such as a chiller, to remove longer chain hydrocarbons such as ethane, propane, and the like. In some implementations, discharge stream 615 may include one or more of hydrogen, longer chain hydrocarbons such as ethane, propane, or a combination thereof, and discharge stream 615 may be utilized as a fuel source, for example in an oxy-combustion process. In some implementations this can contribute to heat stream 119. In some aspects, process units 609 and 611 may include components such as molecular sieves, membranes stripping units, water knockout, or combinations thereof. Components removed from stream 605 by process unit 611 exit process unit 611 as discharge stream 615.

In some implementations at least a portion of the SGC reactor vessel (not shown) includes an open metal foam, such as Ni foam. In some aspects, the open metal foam includes an open, porous structure that could provide enhanced surface area. In some aspects, the enhanced surface area could provide an interface for the catalyst and reactants within the SGC reactor. In some aspects, the open metal foam could include materials such as NOVAMET open cell nickel foam. In some aspects, the open metal foam could be attached to at least a portion of the reactor internals, for example it could be attached to the inside cladding. In some implementations, reactants entering the reactor vessel are forced to pass through a metal foam attached to the internal surfaces of the reaction vessel.

In some aspects, the system 600 can be operated such that all energy requirements including heat stream 119, are provided by electricity. In some aspects, in one or more of the general heat stream 119 provided to the SGC reactor (not shown), the heat may be electrically sourced, and the electrically sourced heat may be generated through resistance or induction methods, or a combination of the two. In some aspects, the integrated calcination syngas production system 600 may operate partially or fully on renewable energy, including sources such as wind, solar, hydro, nuclear or a combination thereof. Optionally, one or more of the general heat source 119, and the heat provided via any heating units (not shown), may be provided by oxy-combustion or air-combustion of a fuel, such as hydrogen, hydrocarbons (e.g., from a downstream unit such as a Fischer Tropsch unit), natural gas, or a combination thereof.

In some aspects, oxy-combustion used for provision of a heat stream 119 to system 600 can be conducted within an SGC reactor of the system 600. In some aspects, heat stream 119 can be provided to system 600 by a combination of electrical heating and oxy-combustion or air combustion of a fuel, such as hydrogen, hydrocarbons (e.g., from a downstream unit such as a Fischer Tropsch unit), natural gas, or a combination thereof. In some aspects, combining electrical heating with oxy-combustion can be used to reduce the electrical heat requirements of system 600.

Figure 8:
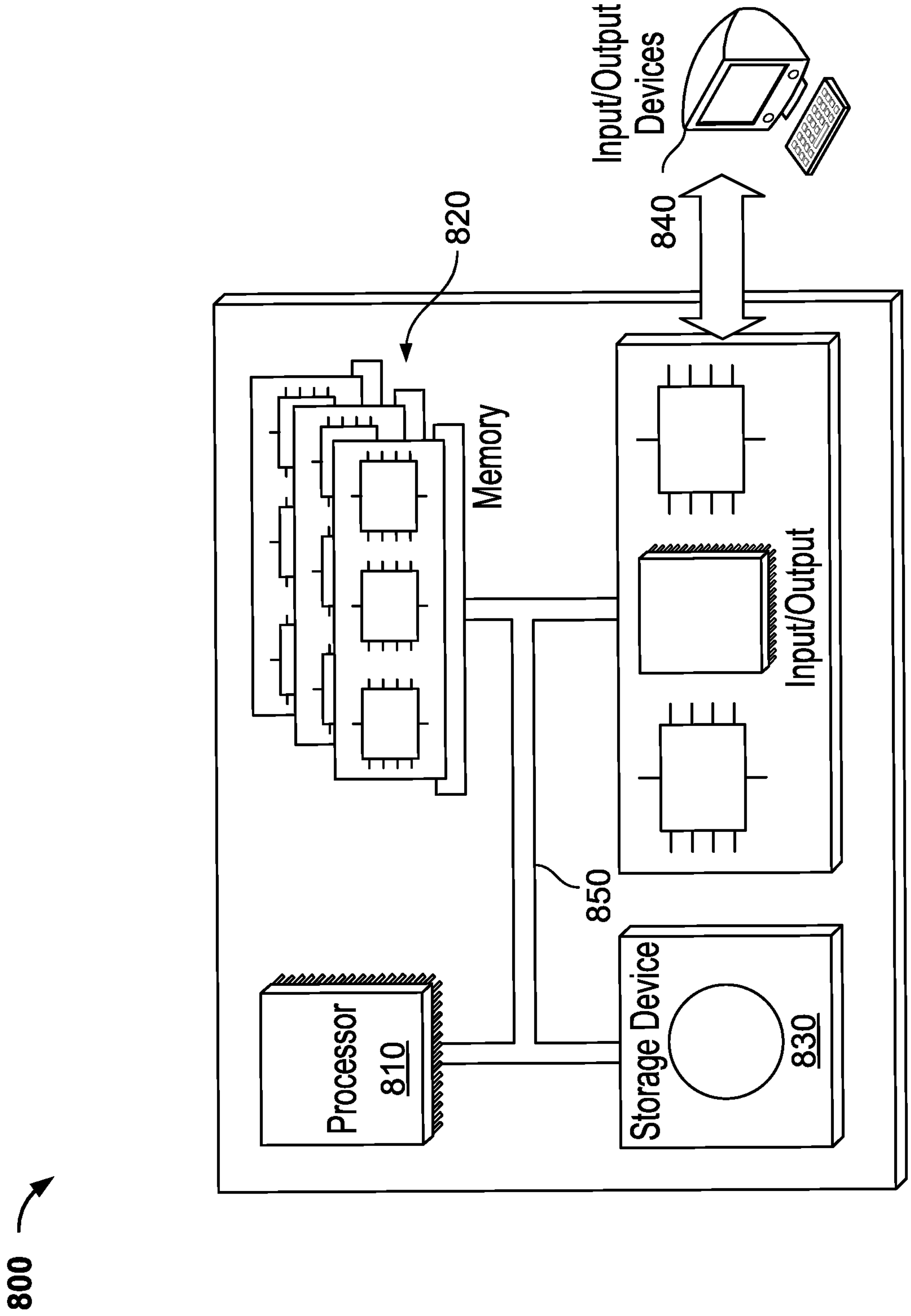
FIG. 8 is a schematic diagram of an example control system for an integrated calcination and syngas production system for converting carbonate material to carbon monoxide.

FIG. 8 is a schematic diagram of a control system (or controller) 800 for an integrated calcination and syngas production system for converting carbonate material to carbon monoxide, such as system 100 shown in FIG. 1. The system 800 can be used for the operations described in association with any of the computer-implemented methods described previously, for example as or as part of the control system 999 or other controllers described herein.

The system 800 is intended to include various forms of digital computers, such as laptops, desktops, workstations, personal digital assistants, servers, blade servers, mainframes, and other appropriate computers. The system 800 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 800 includes a processor 810, a memory 820, a storage device 830, and an input/output device 840. Each of the components 810, 820, 830, and 840 are interconnected using a system bus 850. The processor 810 is capable of processing instructions for execution within the system 800. The processor may be designed using any of a number of architectures. For example, the processor 810 may be a CISC (Complex Instruction Set Computers) processor, a RISC (Reduced Instruction Set Computer) processor, or a MISC (Minimal Instruction Set Computer) processor.

In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840.

The memory 820 stores information within the system 800. In one implementation, the memory 820 is a computer-readable medium. In one implementation, the memory 820 is a volatile memory unit. In another implementation, the memory 820 is a non-volatile memory unit.

The storage device 830 is capable of providing mass storage for the system 800. In one implementation, the storage device 830 is a computer-readable medium. In various different implementations, the storage device 830 may be a floppy disk device, a hard disk device, an optical disk device, or a tape device.

The input/output device 840 provides input/output operations for the system 800. In one implementation, the input/output device 840 includes a keyboard and/or pointing device. In another implementation, the input/output device 840 includes a display unit for displaying graphical user interfaces.

Certain features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a control system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

A number of embodiments of the disclosure have been described. Nevertheless, it will be understood that various modifications may be made without departing from the spirit and scope of the disclosure. Accordingly, other embodiments are within the scope of the following claims. Further modifications and alternative embodiments of various aspects will be apparent to those skilled in the art in view of this description. Accordingly, this description is to be construed as illustrative only. It is to be understood that the forms shown and described herein are to be taken as examples of embodiments. Elements and materials may be substituted for those illustrated and described herein, parts and processes may be reversed, and certain features may be utilized independently, all as would be apparent to one skilled in the art after having the benefit of this description. Changes may be made in the elements described herein without departing from the spirit and scope as described in the following claims.

What is claimed is:

1. An apparatus comprising:

a syngas generating calciner (SGC) reactor that comprises one or more inlet ports arranged to receive at least one feed stream comprising a carbonate material and at least one of hydrogen, oxygen, water, or a hydrocarbon, into a volume of the SGC reactor;

a heat transfer assembly fluidly coupled to the SGC reactor to provide heat; and a reaction zone fluidly coupled to the heat transfer assembly and SGC reactor, the reaction zone being configured to:

transfer at least a portion of the heat to the carbonate material for calcining the carbonate material to produce a solid oxide product and a carbon dioxide product, and react at least a portion of the carbon dioxide product with the at least one of hydrogen, oxygen, water, or a hydrocarbon to produce a syngas product.

2. The apparatus of claim 1, comprising at least one outlet port configured to separate at least a portion of the syngas product from at least one of the carbonate material or the solid oxide product, and discharge the at least a portion of the syngas product out of the SGC reactor.

3. The apparatus of claim 2, wherein the SGC reactor comprises a catalytically active material.

4. The apparatus of claim 3, wherein at least a portion of the catalytically active material is transferred into the SGC reactor through the one or more of the inlet ports, and is discharged from the SGC reactor through the at least one outlet port.

5. The apparatus of claim 4, further comprising at least one transfer device configured to recycle at least a portion of the discharged catalytically active material from the at least one outlet port back to the one or more inlet ports.

6. The apparatus of claim 5, wherein the SGC reactor is fluidly coupled to at least one of a solid separation unit, a catalyst regeneration unit, a heating device, or a downstream process unit, the at least one transfer device is configured to provide the at least a portion of the discharged catalytically active material to at least one of the solid separation unit, the catalyst regeneration unit, the heating device, or the downstream process unit; and a second transfer device is configured to provide the at least a portion of the discharged catalytically active material from at least one of the solid separation unit, the catalyst regeneration unit, the heating device, or the downstream process unit to the inlet port of the SGC reactor.

7. The apparatus of claim 3, wherein the SGC reactor further comprises one or more internal surfaces, and at least a portion of the one or more internal surfaces comprises at least a portion of the catalytically active material or is coated with at least a portion of the catalytically active material.

8. The apparatus of claim 7, wherein the at least a portion of the catalytically active material comprises an open metal foam.

9. The apparatus of claim 1, wherein the SGC reactor further comprises a heating zone, wherein the heating zone comprises a ceramic material.

10. The apparatus of claim 9, wherein the heating zone further comprises a material barrier disposed between one or more walls of the SGC reactor and the ceramic material to prevent the at least one of the carbon dioxide product, the solid oxide product, or the syngas product from entering a space between the one or more walls of the SGC reactor and the ceramic material.

11. The apparatus of claim 9, further comprising a fluid disposed between one or more walls of the SGC reactor and the ceramic material.

12. The apparatus of claim 11, wherein the fluid provides a positive pressure across a space between the one or more walls of the SGC reactor and the ceramic material, and the positive pressure prevents the at least one of the carbon dioxide product, the solid oxide product, or the syngas product from entering a space between the one or more walls of the SGC reactor and the ceramic material.

13. The apparatus of claim 1, wherein the SGC reactor is configured to receive at least one of a first recycle stream or a second recycle stream.

14. The apparatus of claim 13, further comprising at least one of a first process unit or a second process unit, and wherein the first recycle stream is processed by the first process unit and the second recycle stream is processed by the second process unit.

15. The apparatus of claim 14, further comprising at least one of a first discharge stream or a second discharge stream, and wherein the SGC reactor is configured to receive at least one of a portion of the first discharge stream or a portion of the second discharge stream.

16. The apparatus of claim 1, wherein the SGC reactor comprises at least one of a shaft kiln, a rotary kiln, or a fluidized bed calciner.

17. The apparatus of claim 1, wherein the SGC reactor comprises:

an insulated enclosure; and one or more reactor tubes.

18. The apparatus of claim 17, wherein the insulated enclosure comprises a furnace.

19. The apparatus of claim 17, wherein the one or more reactor tubes are filled with metal catalyst material.

20. The apparatus of claim 17, wherein the SGC reactor is fluidly coupled to feed introduction unit, and the feed introduction unit is configured to receive the at least one feed stream and a second feed stream and to provide a combined feed stream to the SGC reactor.

21. The apparatus of claim 20, wherein the feed introduction unit comprises one or more of a blower, lock hopper, screw feeder, rotary valve, eductor, or a combination thereof.

22. The apparatus of claim 1, wherein the SGC reactor is coupled to at least one of a direct air capture plant, a carbon dioxide capture plant, a cement plant, a refractory plant, or a pulp and paper plant.

* * * * *